(12) United States Patent
Tanaka

(10) Patent No.: US 9,760,220 B2
(45) Date of Patent: Sep. 12, 2017

(54) TOUCH DETECTION DEVICE, DISPLAY DEVICE WITH TOUCH DETECTION FUNCTION, AND ELECTRONIC APPARATUS

(71) Applicant: Japan Display Inc., Tokyo (JP)

(72) Inventor: Toshihiko Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 76 days.

(21) Appl. No.: 14/500,083

(22) Filed: Sep. 29, 2014

(65) Prior Publication Data

US 2015/0091861 A1 Apr. 2, 2015

(30) Foreign Application Priority Data

Sep. 30, 2013 (JP) ................. 2013-205743

(51) Int. Cl.
*G06F 3/044* (2006.01)
*G09G 3/36* (2006.01)
*G06F 3/041* (2006.01)

(52) U.S. Cl.
CPC ............ *G06F 3/044* (2013.01); *G06F 3/0416* (2013.01); *G09G 3/3696* (2013.01); *G06F 2203/04108* (2013.01); *G09G 3/3648* (2013.01); *G09G 2310/0264* (2013.01); *G09G 2354/00* (2013.01)

(58) Field of Classification Search
CPC ....................... G06F 2203/04111; G06F 3/044
See application file for complete search history.

(56) References Cited

U.S. PATENT DOCUMENTS

| 5,283,556 A | 2/1994 | Ise |
| 2010/0085324 A1 | 4/2010 | Noguchi et al. |
| 2010/0134422 A1* | 6/2010 | Borras .................... G06F 3/044 345/173 |

(Continued)

FOREIGN PATENT DOCUMENTS

| JP | 02-171818 | 7/1990 |
| JP | 2010039515 | 2/2010 |

(Continued)

OTHER PUBLICATIONS

Office Action received in JP Application 2013-205743, mailed Feb. 2, 2016 (12 pages).

(Continued)

*Primary Examiner* — Jennifer Mehmood
*Assistant Examiner* — Carl Adams
(74) *Attorney, Agent, or Firm* — K&L Gates LLP

(57) ABSTRACT

According to an aspect, a touch detection device, includes drive electrodes arranged in parallel in a predetermined direction; touch detection electrodes arranged in parallel in a direction intersecting with the predetermined direction; an operation drive unit applying a touch detection drive signal to the drive electrodes; and a touch detection unit. The drive electrodes are divided into a plurality of drive signal application blocks. Each of the drive signal application blocks has a drive block overlapped portion on which an arrangement order of the drive electrodes is changed such that an area of at least one of the drive electrodes at an end side in the predetermined direction is swapped for an area of at least one of the drive electrodes in an adjacent drive signal application block at an end side in the predetermined direction.

20 Claims, 23 Drawing Sheets

(56) References Cited

U.S. PATENT DOCUMENTS

| | | | |
|---|---|---|---|
| 2012/0044190 A1* | 2/2012 | Yilmaz | G06F 3/0412 345/174 |
| 2012/0206407 A1* | 8/2012 | Taylor | G06F 3/044 345/174 |
| 2012/0299868 A1* | 11/2012 | Bhagavat | G06F 3/044 345/174 |
| 2013/0201151 A1* | 8/2013 | Takashima | G06F 3/044 345/174 |

FOREIGN PATENT DOCUMENTS

| | | |
|---|---|---|
| JP | 2010-092275 | 4/2010 |
| JP | 2013152680 | 8/2013 |
| KR | 10-2011-0001907 | 1/2011 |
| KR | 10-2011-0120219 | 11/2011 |
| KR | 10-2012-0019371 | 3/2012 |

OTHER PUBLICATIONS

Office Action received in KR Application 10-2014-0131675, mailed Feb. 22, 2016 (15 pages).

\* cited by examiner

TOUCH DETECTION
DRIVE SIGNAL
Vcomt

TOUCH DETECTION
SIGNAL
Vdet

512 FILTER GLASS
510 VIDEO IMAGE DISPLAY SCREEN UNIT
511 FRONT PANEL

SHUTTER BUTTON 524
LIGHT EMITTING UNIT 521

DISPLAY UNIT 522
SHUTTER BUTTON 524
523 MENU SWITCH

TOUCH DETECTION DEVICE, DISPLAY DEVICE WITH TOUCH DETECTION FUNCTION, AND ELECTRONIC APPARATUS

CROSS REFERENCES TO RELATED APPLICATIONS

The present application claims priority to Japanese Priority Patent Application JP 2013-205743 filed in the Japan Patent Office on Sep. 30, 2013, the entire content of which is hereby incorporated by reference.

BACKGROUND

1. Technical Field

The present disclosure relates to a touch detection device, a display device with a touch detection function, and an electronic apparatus that are capable of detecting an external proximity object based on change in an electrostatic capacitance.

2. Description of the Related Art

In recent years, display devices with a touch detection function produced by mounting a touch detection device called a touch panel on a display device such as a liquid crystal display device or integrating the touch panel and the display device have attracted attention. The display devices with the touch detection function display various button images or the like on the display device so as to enable pieces of information to be input using the various button images or the like instead of conventional mechanical buttons. The display devices equipped with the touch panel do not need an input device such as a keyboard, a mouse, and a keypad, so that use thereof expands not only in computers but also in personal digital assistants such as mobile phones.

There are several systems for touch detection operations including an optical system, a resistance system and so on. An electrostatic capacitance system, which has a relatively simple structure and capable of achieving low power consumption, tends to be employed in the portable terminals and the like, in particular. The electrostatic capacitance-type touch detection device has divided drive electrodes to which a display drive signal is applied in a display operation state and a touch detection drive signal is applied in a touch detection operation state, and has touch detection electrodes. Electrostatic capacitances are formed between divided drive electrodes and divided touch detection electrodes. The electrostatic capacitance-type touch detection device detects change in the electrostatic capacitances caused by contact or proximity of an external object, that is, detects change in a voltage waveform appearing on the touch detection electrodes so as to determine presence and absence of touch detection.

As an electrostatic capacitance-type touch detection device, there is a touch detection device including a plurality of detection electrodes that are arranged so as to oppose to a plurality of drive electrodes extending in parallel, be orthogonal to the extending direction of the drive electrodes, and extend in parallel. The touch detection device applies a drive voltage to each of the drive electrodes for scanning and executes touch detection based on voltage waveforms detected by the detection electrodes. The display devices with the touch detection function scans each of a large number of drive electrodes and executes the touch detection operation, resulting in occurrence of a problem that it takes time to scan the entire screen and detect coordinates touched with an external object.

Japanese Patent Application Laid-open Publication No. H02-171818 (JP-A-H02-171818) discloses a display device with a touch detection function that executes scanning by sequentially applying a drive signal to each of blocks which is consist of a plurality of adjacent drive electrodes in order to solve the above-mentioned problem. The display device with the touch detection function as described in JP-A-H02-171818 executes scanning for each block so as to reduce time taken to scan the entire screen and detect coordinates touched with an external object in comparison with the case where it scans each drive electrode and executes the touch detection operation.

Furthermore, Japanese Patent Application Laid-open Publication No. 2010-92275 (JP-A-2010-92275) discloses a display device with a touch detection function that executes scanning by sequentially applying a drive signal to each of blocks which is consist of a plurality of adjacent drive electrodes. Scanning operation is done by shifting the block, to which drive signal is applied, to a subsequent block, and executes the touch operation detection.

The display device with the touch detection function as described in JP-A-H02-171818 cannot detect movement (change in coordinates) in the parallel arrangement direction of the drive electrodes in each block in a touch detected state. This causes a possibility that the accuracy of position detection is lowered.

Furthermore, the display device with the touch detection function as described in JP-A-2010-92275 executes scanning by applying the drive signal to each of blocks, so that touch sensitivity to the external object can be improved. On the other hand, the display device with the touch detection function shifts the block to be scanned for each electrode. That is, time taken to scan the entire screen and detect coordinates touched with the external object is the same as that in the case where scanning is executed for each electrode. Due to this, there is a possibility that the above-mentioned problem of taking time still remains.

For the foregoing reasons, there is a need for a touch detection device, a display device with a touch detection function, and an electronic apparatus that are capable of reducing the scanning time of entire screen, while suppressing a decrease in the accuracy of the position detection.

SUMMARY

According to an aspect, a touch detection device, includes a plurality of drive electrodes arranged in parallel in a predetermined direction; a plurality of touch detection electrodes arranged in parallel in a direction intersecting with the predetermined direction and forming electrostatic capacitances between the touch detection electrodes and the drive electrodes; an operation drive unit applying a touch detection drive signal to the drive electrodes in a touch detection operation of detecting whether an external object makes contact with or is in proximity to the touch detection electrodes; and a touch detection unit detecting a position of the external object that makes contact with or is in proximity to the touch detection electrodes based on touch detection signals detected from the touch detection electrodes in the touch detection operation. The drive electrodes are divided into a plurality of drive signal application blocks. Each of the drive signal application blocks contains equal to or more than three drive electrodes that are electrically connected and has a drive block overlapped portion on which an arrangement order of the drive electrodes is changed such that an area of at least one of the drive electrodes at an end side in the predetermined direction is swapped for an area of at least one of the drive electrodes in an adjacent drive signal application block at an end side in the predetermined direction. The operation drive unit sequentially applies the touch detection drive signal to each of the drive signal application blocks.

According to another aspect, a display device with a touch detection function includes the touch detection device; a plurality of pixel electrodes to which a pixel signal for causing pixels to execute a display operation is applied; and a display drive unit that applies the pixel signal to the pixel electrodes and executes the display operation. The operation drive unit applies a display drive signal synchronized with the pixel signal to the drive electrodes in the display operation.

According to another aspect, an electronic apparatus includes the display device with the touch detection function; and a control device executing processing corresponding to an operation detected by the display device with the touch detection function and supplying a video image signal to the display device with the touch detection function.

Additional features and advantages are described herein, and will be apparent from the following Detailed Description and the figures.

DETAILED DESCRIPTION

Embodiments of the present disclosure will be described in detail in the following order with reference to the drawings.
1. First Embodiment
2. Second Embodiment
3. Third Embodiment
4. Aspects of Present Disclosure

1. First Embodiment

Overall Configuration of Display Device with Touch Detection Function 1

Figure 1:
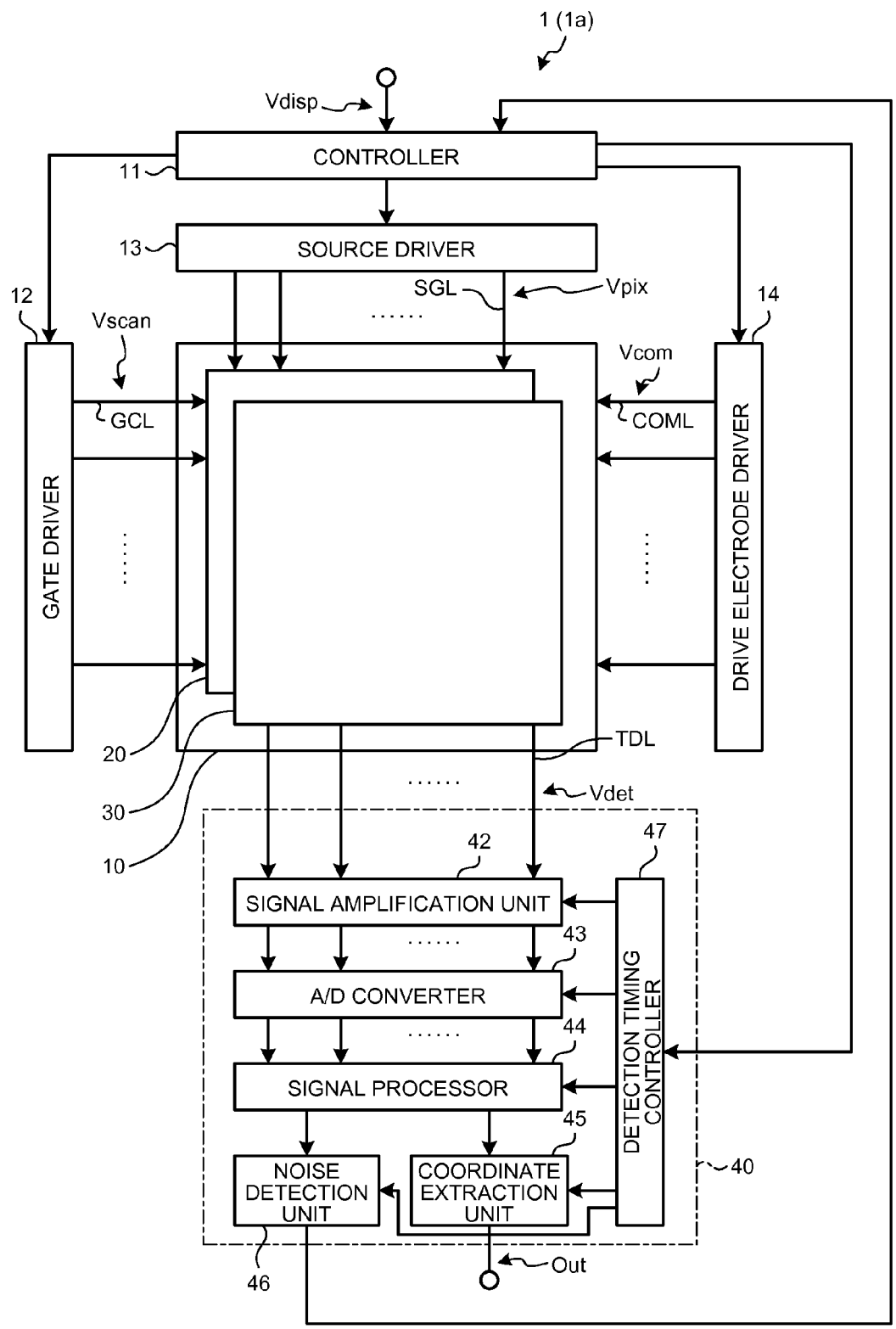
FIG. 1 is a block diagram illustrating an example of the configuration of a display device with a touch detection function according to a first embodiment of the present disclosure.

FIG. 1 is a block diagram illustrating an example of the configuration of a display device with a touch detection function according to a first embodiment of the present disclosure. The overall configuration of this display device with the touch detection function 1 in the embodiment will be described with reference to FIG. 1. The display device with the touch detection function 1 as illustrated in FIG. 1 is a what-is-called in-cell type device that uses liquid crystal display pixels as display pixels and is produced by integrating a liquid crystal display unit 20 formed by the liquid crystal display pixels and an electrostatic capacitance-type touch detection device 30.

As illustrated in FIG. 1, the display device with the touch detection function 1 in the embodiment includes a display unit with a touch detection function 10, a controller 11, a gate driver 12, a source driver 13 (display drive unit), a drive electrode driver 14 (operation drive unit), and a touch detection unit 40.

The display unit with the touch detection function 10 is a display device incorporating a touch detection function. The display unit with the touch detection function 10 includes the liquid crystal display unit 20 and the touch detection device 30.

The liquid crystal display unit 20 is a device that sequentially scans one horizontal line at a time in accordance with a scan signal Vscan output from the gate driver 12 for display as will be described later. The touch detection device 30 is a device that sequentially scans one drive signal application block at a time in accordance with a touch detection drive signal Vcomt output from the drive electrode driver 14 for a touch detection operation as will be described later. The touch detection device 30 outputs touch detection signals Vdet from a plurality of touch detection electrodes TDL for each drive signal application block and supplies them to the touch detection unit 40.

The controller 11 outputs a control signal to each of the gate driver 12, the source driver 13, the drive electrode driver 14, and the touch detection unit 40 based on a video image signal Vdisp input externally, and controls them to operate in synchronization with one another.

The gate driver 12 is a circuit having a function of sequentially selecting one horizontal line as a target of a display operation by the liquid crystal display unit 20 of the display unit with the touch detection function 10 based on the control signal output from the controller 11. To be specific, the gate driver 12 applies, through a scan signal line GCL, the scan signal Vscan to gates of thin film transistor (TFT) elements Tr on one row (one horizontal line) among pixels Pix (which will be described later) formed on the liquid crystal display unit 20 of the display unit with the touch detection function 10 in a matrix form so as to sequentially scan one horizontal line at a time for display of the entire screen.

The source driver 13 is a circuit that outputs a pixel signal Vpix to each of the pixels Pix on the liquid crystal display unit 20 of the display unit with the touch detection function 10 based on the control signal output from the controller 11. To be specific, the source driver 13 applies, through pixel signal lines SGL, the pixel signal Vpix to each of the pixels Pix forming one horizontal line that is sequentially selected by the gate driver 12. The respective pixels Pix forming one horizontal line receive the pixel signal Vpix applied thereto so as to execute the display operation.

The drive electrode driver 14 is a circuit that applies a display drive signal Vcomd to drive electrodes COML of the display unit with the touch detection function 10 in a display operation state and applies the touch detection drive signal Vcomt thereto in a touch detection operation state based on the control signal output from the controller 11.

The touch detection unit 40 detects whether an external object (finger, stylus, or the like) makes contact with or in proximity to the touch detection device 30 in a touch detection period based on the control signal output from the controller 11 and the touch detection signals Vdet output from the touch detection electrodes TDL of the touch detection device 30. The touch detection unit 40 is a circuit that obtains coordinates and the like of a region on which a touch has been detected when contact or proximity of the external object has been detected (hereinafter, referred to as touch detection simply). The touch detection unit 40 includes a signal amplification unit 42, an analog-to-digital (A/D) converter 43, a signal processor 44, a coordinate extraction unit 45, a noise detection unit 46, and a detection timing controller 47.

The signal amplification unit 42 is a circuit that amplifies the touch detection signals Vdet output from the touch detection electrodes TDL of the touch detection device 30. The signal amplification unit 42 may include a low-pass analog filter for removing high frequency components (noise components) contained in the touch detection signals Vdet. Alternatively, the signal amplification unit 42 may have only a low-pass analog filter function of which amplification factor is 1-fold. The touch detection signals Vdet may be input to the A/D converter 43 directly without passing through the signal amplification unit 42.

The A/D converter 43 is a circuit that samples analog signals output from the signal amplification unit 42 and converts them to digital signals at an appropriate timing. For example, it is sufficient that the A/D converter 43 may sample the analog signals output from the signal amplification unit 42 and convert them to digital signals at a timing synchronized with the touch detection drive signals Vcomt or at a sampling frequency higher than that corresponding to the timing in the touch detection period.

Although the touch detection unit 40 causes the A/D converter 43 to convert the analog signals output from the signal amplification unit 42 to the digital signals, the disclosure is not limited thereto. That is to say, the touch detection unit 40 may cause to execute filter processing corresponding to the function of the signal amplification unit 42 on the digital signals after A/D conversion corresponding to the function of the A/D converter 43.

The signal processor 44 is a circuit that determines presence and absence of touch detection on the touch detection device 30 based on the signals output from the A/D converter 43 in the touch detection period.

The coordinate extraction unit 45 is a circuit that obtains coordinates of the region on which a touch has been detected and outputs coordinate data thereof as an output signal Out when the signal processor 44 has detected touch in the touch detection period.

When the signal output from the signal processor 44 contains noise, the noise detection unit 46 outputs a noise notification signal to the controller 11.

The detection timing controller 47 controls the circuits constituting the touch detection unit 40 to operate in synchronization with one another.

The constituent components including the touch detection electrodes TDL, the touch detection unit 40 that detects the touch detection signals Vdet from the touch detection electrodes TDL, the drive electrodes COML, and the drive electrode driver 14 that applies the touch detection drive signal Vcomt to the drive electrodes COML correspond to a "touch detection device" in the disclosure.

Basic Principle of Electrostatic Capacitance-Type Touch Detection Operation

Figure 2:
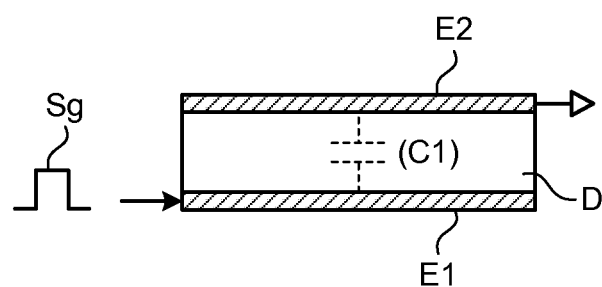
FIG. 2 is an explanatory diagram illustrating a state where a finger does not make contact with or is not in proximity to a device for explaining a basic principle of an electrostatic capacitance-type touch detection operation.
Figure 3:
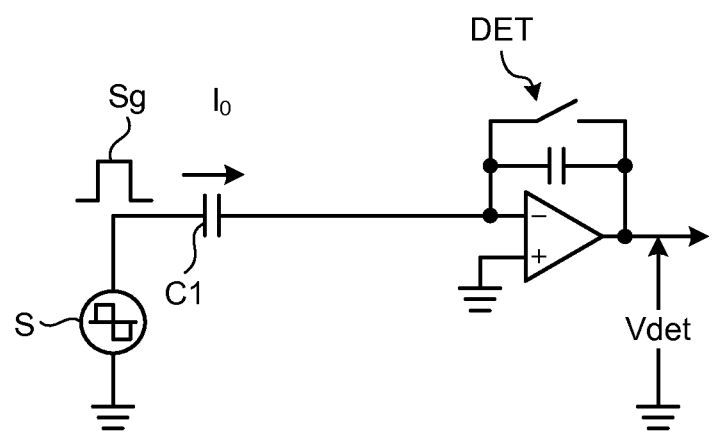
FIG. 3 is a diagram illustrating an example of an equivalent circuit expressing the state where the finger does not make contact with or is not in proximity to the device in FIG. 2.
Figure 4:
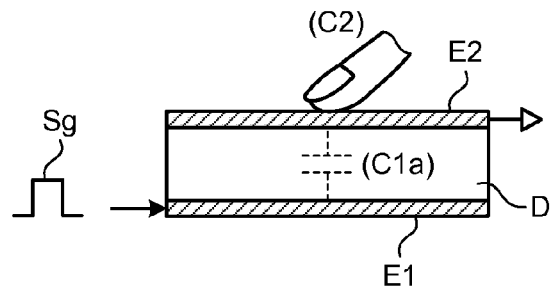
FIG. 4 is an explanatory diagram illustrating a state where the finger makes contact with or is in proximity to a device for explaining the basic principle of the electrostatic capacitance-type touch detection operation.
Figure 5:
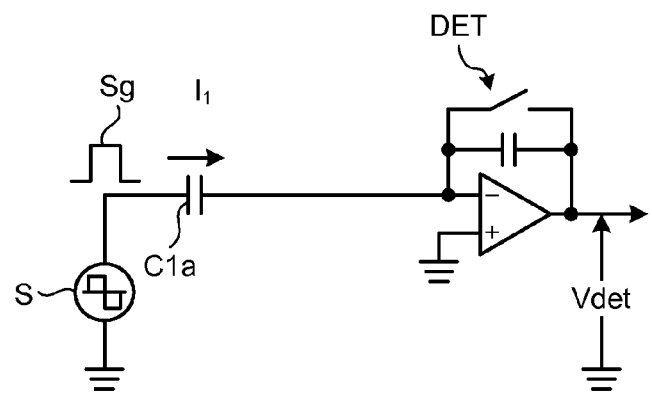
FIG. 5 is a diagram illustrating an example of an equivalent circuit expressing the state where the finger makes contact with or is in proximity to the device in FIG. 4.
Figure 6:
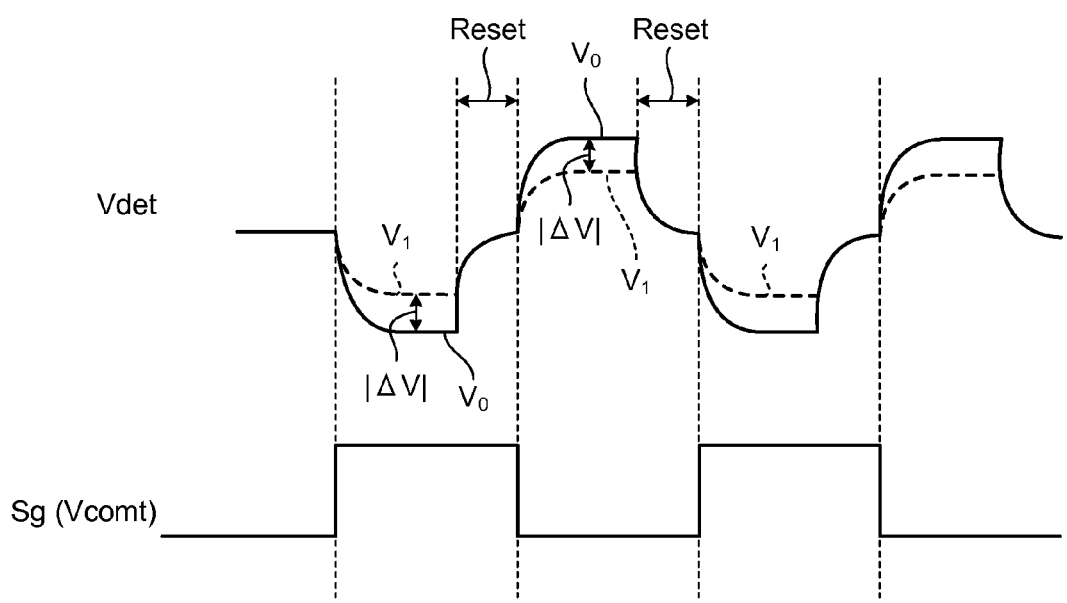
FIG. 6 is a diagram illustrating an example of waveforms of a drive signal and a touch detection signal when an external object makes contact with or is in proximity to a device and when the external object does not make contact with or is not in proximity to a device.

FIG. 2 is an explanatory diagram illustrating a state where a finger does not make contact with or is not in proximity to a device for explaining a basic principle of an electrostatic capacitance-type touch detection operation. FIG. 3 is a diagram illustrating an example of an equivalent circuit expressing the state where the finger does not make contact with or is not in proximity to the device in FIG. 2. FIG. 4 is an explanatory diagram illustrating a state where the finger makes contact with or is in proximity to a device for explaining the basic principle of the electrostatic capacitance-type touch detection operation. FIG. 5 is a diagram illustrating an example of an equivalent circuit expressing the state where the finger makes contact with or is in proximity to the device in FIG. 4. FIG. 6 is a diagram illustrating an example of waveforms of a drive signal and a touch detection signal when an external object makes contact with or is in proximity to a device and when the external object does not make contact with or is not in proximity to a device. The basic principle of the touch detection operation in the display device with the touch detection function 1 in the embodiment will be described with reference to FIG. 2 to FIG. 6.

The touch detection operation in the display device with the touch detection function 1 in the embodiment is embodied by an electrostatic capacitance system. For example, as illustrated in FIG. 2 and FIG. 4, a capacitive element C1 includes a pair of electrodes (drive electrode E1 and touch detection electrode E2) arranged so as to oppose each other with a dielectric material D interposed therebetween. As illustrated in FIG. 3, one end of the capacitive element C1 is coupled to an alternating-current (AC) signal source S and the other end thereof is coupled to a voltage detector DET. For example, the voltage detector DET is an integration circuit included in the signal amplification unit 42 as illustrated in FIG. 1.

When an AC square wave Sg of a predetermined frequency (for example, frequency of approximately several kilohertz to several hundred kilohertz) is applied to the drive electrode E1 from the AC signal source S, a touch detection signal Vdet having an output waveform as illustrated in FIG. 6 appears through the voltage detector DET coupled to the touch detection electrode E2. The AC square wave Sg that is output from the AC signal source S corresponds to the touch detection drive signal Vcomt (which will be described later) that is output from the drive electrode driver 14. The drive electrode E1 corresponds to the drive electrode COML and the touch detection electrode E2 corresponds to the touch detection electrode TDL.

In a state (non-contact state) where the finger does not make contact with or is not in proximity to the touch detection electrode E2 as illustrated in FIG. 2, an electric current $I_0$ in accordance with the electrostatic capacitance of the capacitive element C1 flows with charging to and discharging from the capacitive element C1, as illustrated in FIG. 3. The voltage detector DET as illustrated in FIG. 3 converts fluctuation of the current $I_0$ in accordance with the AC square wave Sg to fluctuation (waveform $V_0$ as indicated by a solid line in FIG. 6) of the voltage.

On the other hand, in a state (contact state) where the finger makes contact with or is in proximity to the touch detection electrode E2 as illustrated in FIG. 4, a fringe capacitance based on an electric field protruding from ends of the drive electrode E1 and the touch detection electrode E2 is absorbed as an electrostatic capacitance C2 of the finger. As a result, the capacitive element C1 changes to a capacitive element C1a having a capacitance value smaller than an original capacitance value. As illustrated in FIG. 5, a current $I_1$ in accordance with an electrostatic capacitance of the capacitive element C1a flows with charging to and discharging from the capacitive element C1a. The voltage detector DET as illustrated in FIG. 5 converts fluctuation of the current $I_1$ in accordance with the AC square wave Sg to fluctuation (waveform $V_1$ as indicated by a dashed line in FIG. 6) of the voltage.

As illustrated in FIG. 6, the waveform $V_1$ has an amplitude smaller than that of the above-mentioned waveform $V_0$. This indicates that an absolute value $|\Delta V|$ of a voltage difference $\Delta V$ between the waveform $V_0$ and the waveform $V_1$ changes depending on influence by the external object (finger, stylus, or the like) that makes close externally. The voltage detector DET preferably operates with a period Reset in which electric charges accumulated in a capacitor are discharged in accordance with the frequency of the AC square wave Sg by a switching element in order to detect the absolute value $|\Delta V|$ of the voltage difference $\Delta V$ with high accuracy.

The touch detection device 30 as illustrated in FIG. 1 sequentially scans one detection block at a time in accordance with the drive signal Vcom (drive signal VcomAC, which will be described later) supplied from the drive electrode driver 14 for touch detection.

The touch detection device 30 outputs the touch detection signals Vdet from the touch detection electrodes TDL, which will be described later, through the voltage detector DET as illustrated in FIG. 3 or FIG. 5 for each detection block, and supplies them to the A/D converter 43 of the touch detection unit 40.

The A/D converter 43 is a circuit that samples analog signals output from the touch detection signal amplification unit 42 at a timing synchronized with the drive signal VcomAC and converts them to digital signals.

The signal processor 44 includes a digital filter for reducing frequency components (noise components) other than the frequency obtained by sampling the drive signal VcomAC that are contained in the output signals from the A/D converter 43. The signal processor 44 is a logic circuit that detects presence and absence of touch onto the touch detection device 30 based on the output signals from the A/D converter 43. The signal processor 44 performs processing of extracting a difference in the voltage due to the finger. The difference in the voltage due to the finger corresponds to the absolute value $|\Delta V|$ of the voltage difference $\Delta V$ between the waveform $V_0$ and the waveform $V_1$ as described above.

The signal processor 44 may perform an operation of averaging the absolute values $|\Delta V|$ for one detection block so as to obtain an average value of the absolute value $|\Delta V|$. This enables the signal processor 44 to reduce influence by noise. The signal processor 44 compares the difference in the voltage due to the finger detected with a predetermined threshold voltage and determines that an external proximity object is in the contact state when the difference in the voltage is equal to or higher than the threshold voltage. On the other hand, the signal processor 44 determines that the external proximity object is in the non-contact state when the difference in the voltage is lower than the threshold voltage. In this manner, the touch detection unit 40 can make touch detection.

Example of Configuration of Display Unit with Touch Detection Function 10

Figure 7:
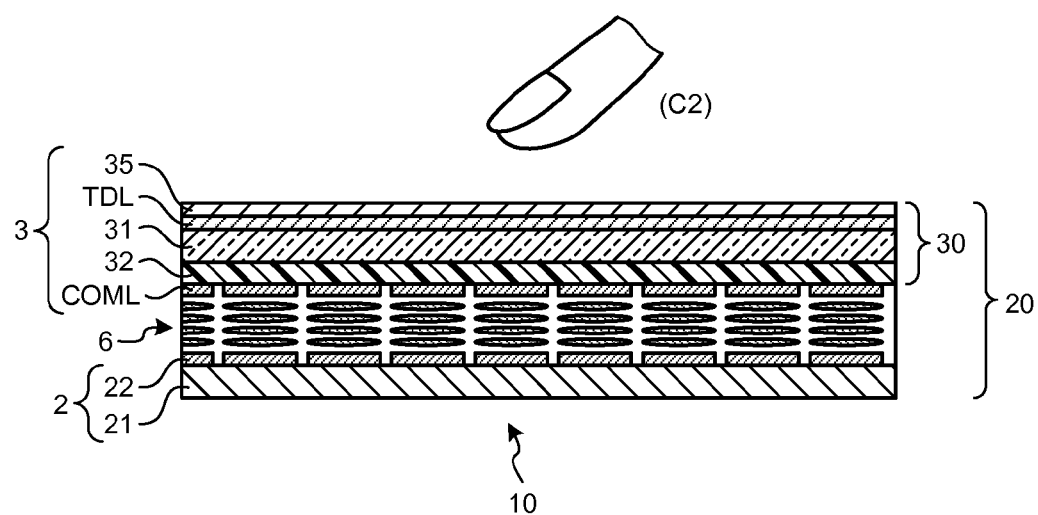
FIG. 7 is a schematic cross-sectional view illustrating a display unit with a touch detection function in the first embodiment of the present disclosure.
Figure 8:
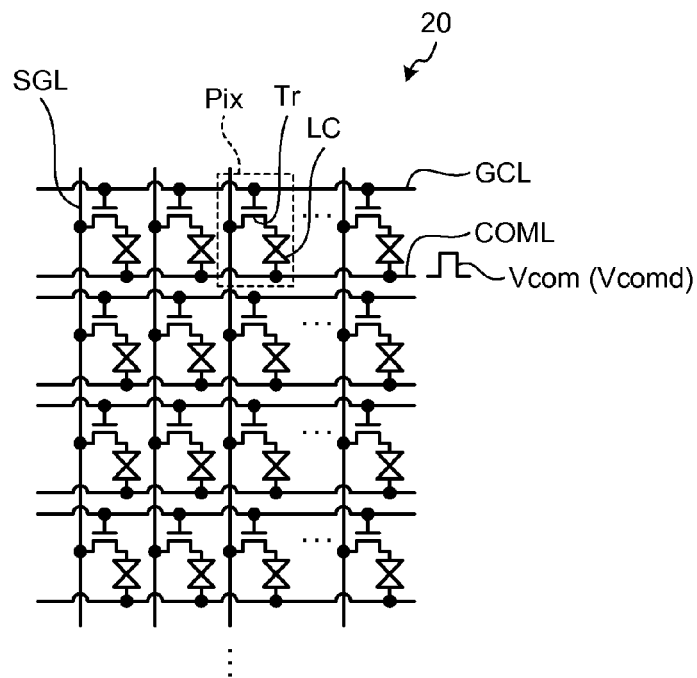
FIG. 8 is a circuit diagram illustrating pixel array on a liquid crystal display unit of the display unit with the touch detection function in the first embodiment of the present disclosure.
Figure 9:
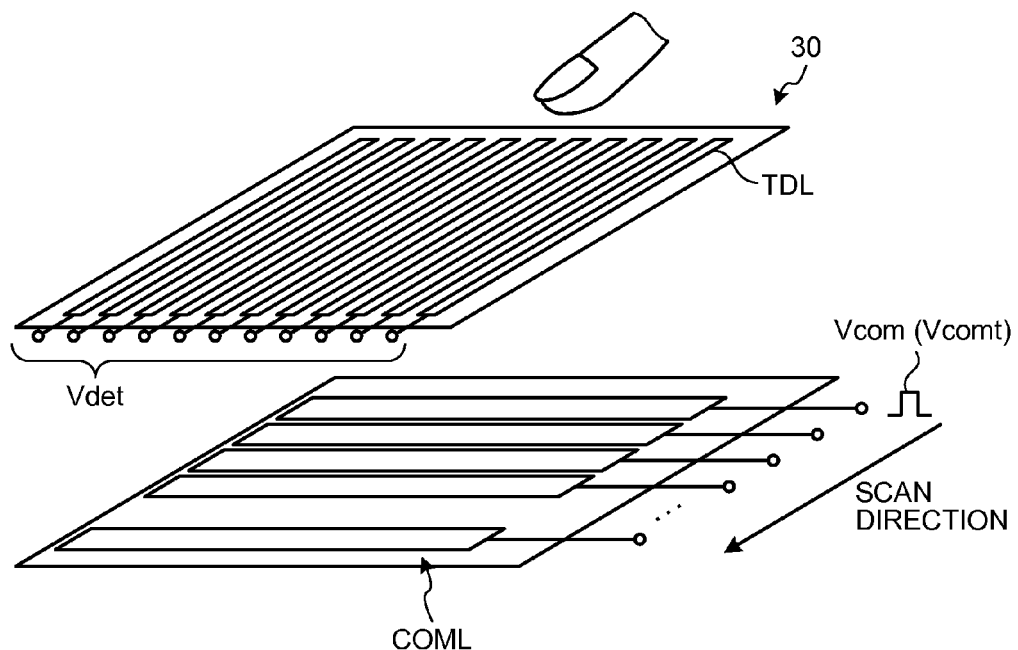
FIG. 9 is a perspective view illustrating an example of the configuration of drive electrodes and touch detection electrodes of the display unit with the touch detection function in the first embodiment of the present disclosure.

FIG. 7 is a schematic cross-sectional view illustrating the display unit with the touch detection function in the embodiment. FIG. 8 is a circuit diagram illustrating pixel array on the liquid crystal display unit of the display unit with the touch detection function in the embodiment. FIG. 9 is a perspective view illustrating an example of the configuration of the drive electrodes and the touch detection electrodes of the display unit with the touch detection function in the embodiment. An example of the configuration of the display unit with the touch detection function 10 is described with reference to FIG. 7 to FIG. 9.

As illustrated in FIG. 7, the display unit with the touch detection function 10 includes a pixel substrate 2, a counter substrate 3 arranged so as to oppose the pixel substrate 2, and a liquid crystal layer 6 inserted between the pixel substrate 2 and the counter substrate 3.

The pixel substrate 2 includes a TFT substrate 21 as a circuit substrate and a plurality of pixel electrodes 22 as transparent electrodes arranged on the TFT substrate 21 in a matrix form and made of indium tin oxide (ITO) or the like. On the TFT substrate 21, thin film transistor (TFT) elements Tr of the pixels Pix as illustrated in FIG. 8 and wirings such as the pixel signal lines SGL for supplying the pixel signal Vpix to the pixel electrodes 22 and the scan signal lines GCL for driving the TFT elements Tr are formed. As illustrated in FIG. 8, the liquid crystal display unit 20 includes the pixels Pix arranged in the matrix form. As will be described later, the liquid crystal display unit 20 is a device that sequentially scans one horizontal line at a time in accordance with the scan signal Vscan output from the gate driver 12 for the display operation.

Each pixel Pix includes the TFT element Tr and a liquid crystal element LC. A source of the TFT element Tr is coupled to the pixel signal line SGL, a gate thereof is coupled to the scan signal line GCL, and a drain thereof is coupled to the pixel electrode 22. Furthermore, the liquid crystal element LC is interposed between the pixel electrode 22 and the drive electrode COML opposing to each other.

As illustrated in FIG. 8, the respective pixels Pix are coupled to other pixels Pix belonging to the same rows in the liquid crystal display unit 20 with the scan signal lines GCL and are coupled to other pixels Pix belonging to the same columns in the liquid crystal display unit 20 with the pixel signal lines SGL. The scan signal lines GCL are coupled to the gate driver 12 and are supplied with the scan signal Vscan from the gate driver 12. The pixel signal lines SGL are coupled to the source driver 13 and are supplied with the pixel signal Vpix from the source driver 13. Furthermore, the pixels Pix are coupled to other pixels Pix belonging to the same rows in the liquid crystal display unit 20 with the drive electrodes COML. The drive electrodes COML are coupled to the drive electrode driver 14 and are supplied with the drive signal Vcom from the drive electrode driver 14. The drive signal Vcom (display drive signal Vcomd and touch detection drive signal Vcomt, which will be described later) having an AC square waveform is applied to the drive electrodes COML from the drive electrode driver 14 through a contact conductive pillar (not illustrated).

When the display operation is executed with the configuration of the liquid crystal display unit 20 as described above, the gate driver 12 sequentially scans the scan signal lines GCL with the scan signal Vscan in a time-divided manner so as to sequentially select one horizontal line. The source driver 13 supplies the pixel signal Vpix to the pixels Pix belonging to one horizontal line on the liquid crystal display unit 20, so that the display operation is executed for one horizontal line at a time. When the display operation is executed, the drive electrode driver 14 applies the display drive signal Vcomd to the drive signal application blocks containing the drive electrodes COML corresponding to one horizontal line to align liquid crystal molecules with electric fields by the pixel electrodes 22 and the drive electrodes COML. Note that the drive electrode COML can be also referred to as a common electrode in the display operation.

The counter substrate 3 includes a glass substrate 31, a color filter 32, and the drive electrodes COML. The color filter 32 is arranged on the surface of the glass substrate 31 at the liquid crystal layer 6 side. The drive electrodes COML are arranged on the surface of the color filter 32 at the liquid crystal layer 6 side. The counter substrate 3 includes the touch detection electrodes TDL and a polarization plate 35. The touch detection electrodes TDL are arranged on the surface of the glass substrate 31 at the side opposite to the liquid crystal layer 6. The polarization plate 35 is arranged on the touch detection electrodes TDL at the side opposite to the liquid crystal layer 6 side. As illustrated in FIG. 9, the touch detection device 30 includes the drive electrodes COML and the touch detection electrodes TDL that are provided on the counter substrate 3. The drive electrodes COML are arranged in parallel in a stripe form. The touch detection electrodes TDL oppose to the drive electrodes COML, extend in the direction orthogonal to the drive electrodes COML, and are arranged in parallel in a stripe form. The touch detection device 30 is a device that sequentially scans the drive signal application block at a time in accordance with the touch detection drive signal Vcomt output from the drive electrode driver 14 for the touch detection operation, as will be described later.

The color filter 32 is formed by regularly arranging color filter layers of three colors of red (R), green (G), and blue (B), and any of the three colors of R, G, B corresponds to each of the above-mentioned pixels Pix as illustrated in FIG. 8.

The drive electrodes COML function as the drive electrodes (common electrodes) of the liquid crystal display unit 20 and also function as drive electrodes of the touch detection device 30. This configuration can reduce the thickness of the display unit with the touch detection function 10 and synchronize the liquid crystal display unit 20 and the touch detection device 30 with each other. One drive electrode COML is arranged so as to oppose to the pixel electrodes 22 arranged on one horizontal line.

The respective touch detection electrodes TDL are coupled to the signal amplification unit 42 of the touch detection unit 40 and have electrostatic capacitances on respective intersecting portions between the touch detection electrodes TDL and the drive electrodes COML.

The polarization plate 35 is a plate-like member that transmits only a light component in the specific vibration direction among light components output from a backlight (not illustrated). The polarization plate 35 has a configuration in which a polarization film created by causing iodine to adsorb to a polyvinyl alcohol (PVA) film or the like and extending it is interposed between protection films such as triacetylcellulose (TAC) films from both sides, for example. The backlight is a light source member that is arranged on the display unit with the touch detection function 10 at the pixel substrate 2 side and emits uniform light to the display unit with the touch detection function 10. As the backlight, for example, a backlight produced by laminating a diffusion plate, a prism sheet, and a diffusion sheet on a cold-cathode tube or a hot-cathode tube arranged on a reflection plate and integrating them can be employed. Alternatively, a backlight having an edge light configuration in which light emitting diodes (LEDs) are arranged on a side surface of a light guide plate as a resin plate made of acrylic or the like may be employed.

When the touch detection device 30 having the above-mentioned configuration executes the touch detection operation, the drive electrode driver 14 sequentially scans drive signal application blocks B1 to Bm, which will be described later, with the touch detection drive signal Vcomt in a time-divided manner for driving so as to sequentially select a touch detection block. Then, the touch detection unit 40 receives the touch detection signals Vdet from the touch detection electrodes TDL and determines presence and absence of touch detection on the selected block. That is to say, the touch detection device 30 and the touch detection unit 40 execute the touch detection operation in accordance with the above-mentioned basic principle of the touch detection operation.

The liquid crystal layer 6 is a layer that rotates or double-refracts light transmitting the layer depending on states of the electric field. As a driving system of the liquid crystal in the liquid crystal layer 6, for example, any of various driving systems such as a twisted nematic (TN) mode, a vertical alignment (VA) mode, and an optically compensated bend (OCB) mode is used.

An alignment film (not illustrated) is arranged between the liquid crystal layer 6 and the pixel substrate 2 and between the liquid crystal layer 6 and the counter substrate 3. An incident-side polarization plate may be arranged on the surface of the pixel substrate 2 at the side opposite to the surface on which the pixel electrodes 22 are arranged. The alignment film is a film that aligns the molecules of the liquid crystal in the liquid crystal layer 6 to a constant direction. The alignment film is formed by rubbing processing of rubbing a polyimide film made of resin by a roller around which fabric such as nylon is wound in the constant direction or by photo-alignment processing of irradiating the polyimide film with ultraviolet rays so as to induce anisotropy.

Outline of Overall Operations

Figure 10:
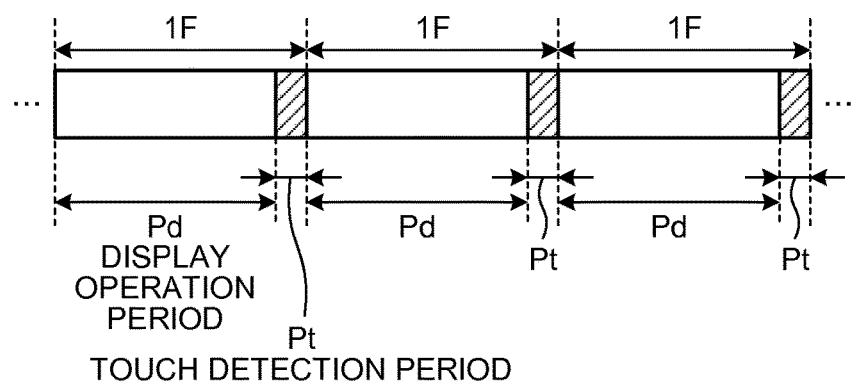
FIG. 10 is a view illustrating a relation between display operation periods and touch detection periods of the display device with the touch detection function in the first embodiment of the present disclosure.

FIG. 10 is a view illustrating a relation between display operation periods and touch detection periods of the display device with the touch detection function in the first embodiment of the present disclosure. The outline of the overall operations of the display device with the touch detection function 1 in the embodiment will be described with reference to FIG. 10.

As illustrated in FIG. 10, one frame period (1F) is constituted by a display operation period Pd and a touch detection period Pt. That is to say, the touch detection period Pt is set in a vertical blanking interval in the display operation. The display device with the touch detection function 1 executes the display operation on a screen GS (see FIG. 11 to FIG. 13 below) on the display unit with the touch detection function 10 in the display operation period Pd and executes the touch detection operation on the screen GS in the touch detection period Pt. The display device with the touch detection function 1 alternately executes the display operation in the display operation period Pd and the touch detection operation in the touch detection period Pt repeatedly in the time-divided manner. The display device with the touch detection function 1 executes the display operation for one screen on the screen GS in each display operation period Pd and executes the touch detection operation for one screen on the screen GS in each touch detection period Pt.

First, the controller 11 outputs the control signal to each of the gate driver 12, the source driver 13, the drive electrode driver 14, and the touch detection unit 40 based on the video image signal Vdisp input externally, and controls them to operate in synchronization with one another. The controller 11 controls execution of the display operation in the display operation period Pd and the touch detection operation in the touch detection period Pt in the time-divided manner.

In the display operation period Pd, the gate driver 12 outputs the scan signal Vscan to the predetermined number of scan signal lines GCL on the liquid crystal display unit 20 so as to sequentially select one horizontal line as a target of the display operation among the pixels Pix arranged on the liquid crystal display unit 20 in the matrix form. The source driver 13 outputs the pixel signal Vpix to the pixel electrodes of the pixels Pix constituting one horizontal line selected by the gate driver 12 through the pixel signal lines SGL in the display operation period Pd. The display operation for one horizontal line is executed on these pixels Pix in accordance with the supplied pixel signal Vpix. The drive electrode driver 14 sequentially applies the display drive signal Vcomd to drive signal application blocks A1 to An (which will be described later) each of which is constituted by the predetermined number of drive electrodes COML corresponding to one horizontal line selected by the gate driver 12 in the display operation period Pd. Thus, the display unit with the touch detection function 10 executes the display operation based on the respective signals output from the gate driver 12, the source driver 13, and the drive electrode driver 14 in the display operation period Pd.

In the touch detection period Pt, the drive electrode driver 14 sequentially applies the touch detection drive signal Vcomt to the drive signal application blocks B1 to Bm each of which is constituted by the predetermined number of drive electrodes COML so as to sequentially select the touch detection block. The touch detection electrodes TDL of the touch detection device 30 output the touch detection signals Vdet that are generated by the touch detection drive signal Vcomt applied to the drive electrodes COML.

In the touch detection period Pt, the signal amplification unit 42 amplifies the touch detection signals Vdet output from the touch detection electrodes TDL and removes high frequency components (noise components) contained in the touch detection signals Vdet. The A/D converter 43 samples the analog signals output from the signal amplification unit 42 and converts them to digital signals in the touch detection period Pt. To be specific, the A/D converter 43 samples the analog signals output from the signal amplification unit 42 and converts them to digital signals at a timing synchronized with the touch detection drive signal Vcomt or at a sampling frequency higher than that corresponding to the timing. The signal processor 44 determines presence and absence of the touch detection on the touch detection device 30 based on the digital signals output from the A/D converter 43 in the touch detection period Pt. The coordinate extraction unit 45 obtains coordinates of a region on which a touch has been detected based on the digital signal input from the signal processor 44 and outputs coordinate data thereof as an output signal Out when the signal processor 44 has detected touch in the touch detection period Pt. The detection timing controller 47 controls the signal amplification unit 42, the A/D converter 43, the signal processor 44, the coordinate extraction unit 45, and the noise detection unit 46 to operate in synchronization with one another. Thus, the display unit with the touch detection function 10 and the touch detection unit 40 execute the touch detection operation based on the touch detection signals Vdet output from the touch detection electrodes TDL in the touch detection period Pt.

Although the display device with the touch detection function 1 executes the operation for one screen on the screen GS in each period, the disclosure is not limited thereto. For example, the display device with the touch detection function 1 may execute the operation for equal to or more than one screen or equal to or less than one screen on the screen GS.

Various signals (scan signal Vscan and pixel signal Vpix) for executing the display operation are not output to the liquid crystal display unit 20 in the touch detection period Pt in which the touch detection operation is executed. Accordingly, the scan signal lines GCL and the pixel signal lines SGL arranged on the pixel substrate 2 are made into floating states or states where a direct-current (DC) potential is applied thereto in the touch detection period Pt. This can reduce the possibility that noise is transmitted to the touch detection electrodes TDL from the scan signal lines GCL and the pixel signal lines SGL through parasitic capacitance. That is to say, the display device with the touch detection function 1 in the embodiment can reduce influence by internal noise on the touch detection operation.

Display Operation in Display Operation Period Pd

Figure 11:
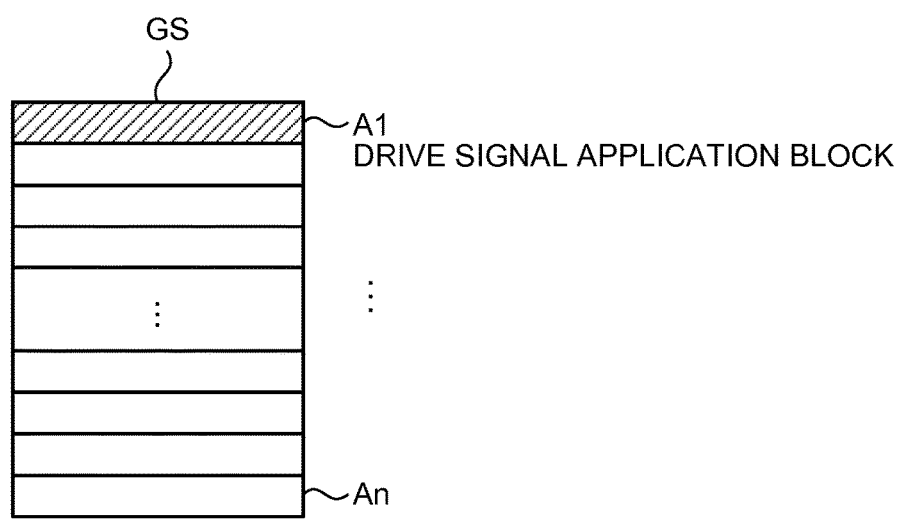
FIG. 11 is a view illustrating an example of operations of a drive electrode driver in a display operation in the first embodiment of the present disclosure.
Figure 12:
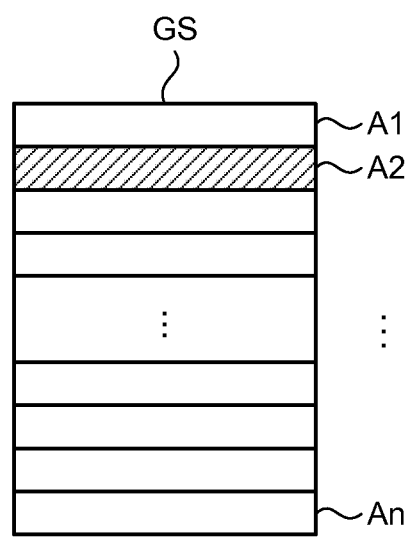
FIG. 12 is a view illustrating an example of the operations of the drive electrode driver in the display operation in the first embodiment of the present disclosure.
Figure 13:
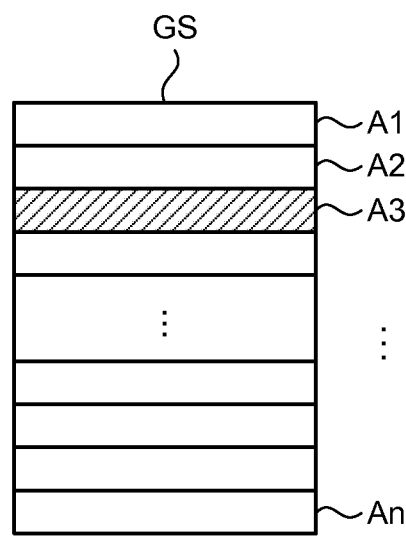
FIG. 13 is a view illustrating an example of the operations of the drive electrode driver in the display operation in the first embodiment of the present disclosure.
Figure 14:
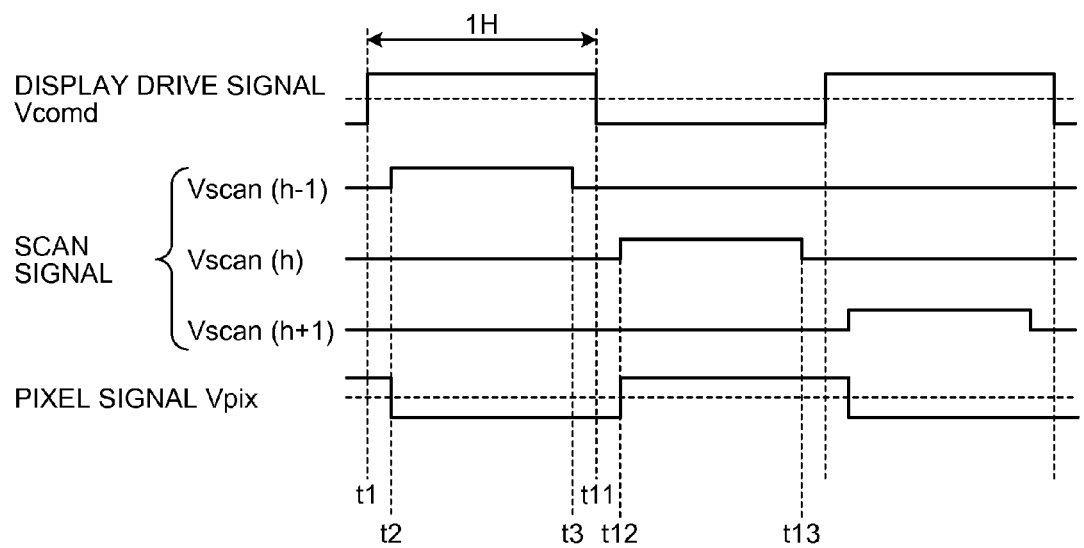
FIG. 14 is a diagram illustrating an example of timings of each signal in the display operation period in the display device with the touch detection function in the first embodiment of the present disclosure.

FIG. 11 to FIG. 13 are views illustrating an example of operations of the drive electrode driver in the display operation in the first embodiment of the present disclosure. FIG. 14 is a diagram illustrating an example of timings of each signal in the display operation period in the display device with the touch detection function in the first embodiment of the present disclosure. The display operation in the display operation period Pd of the display device with the touch detection function 1 in the embodiment will be described with reference to FIG. 11 to FIG. 14.

FIG. 14 illustrates a waveform of the display drive signal Vcomd, waveforms of the scan signals Vscan, and a waveform of the pixel signal Vpix. FIG. 14 illustrates an example when the display operation in the display operation period Pd in one frame period (1F) is executed by line inversion driving. Hereinafter, description is made while the specific drive signal application block A1 as illustrated in FIG. 11 among the drive signal application blocks A1 to An on the screen GS is set to a drive target. A reference character h in FIG. 14 indicates one horizontal line of a specific row (the h-th row) among the pixels Pix formed in the matrix form.

The drive electrode driver 14 applies the display drive signal Vcomd to the drive electrodes COML belonging to the drive signal application block A1 and changes a voltage level thereof to a high level from a low level at a timing t1. One horizontal period (1H) is started from a change point of the voltage level of the display drive signal Vcomd.

Then, the gate driver 12 applies a scan signal Vscan (h−1) to the scan signal lines GCL corresponding to the pixels Pix on one horizontal line of the (h−1)th row contained in the drive signal application block A1 and changes a voltage level thereof to a high level from a low level at a timing t2. The source driver 13 applies the pixel signal Vpix to the pixel signal lines SGL and changes a voltage level thereof to a low level from a high level at the same timing t2. With this, the display operation on the pixels Pix on one horizontal line of the (h−1)th row is started.

Subsequently, the gate driver 12 changes the voltage level of the scan signal Vscan (h−1) applied to the scan signal lines GCL corresponding to the pixels Pix on one horizontal line of the (h−1)th row to the low level from the high level at a timing t3. With this, the display operation on the pixels Pix on one horizontal line of the (h−1)th row is finished.

Thereafter, the drive electrode driver 14 applies the display drive signal Vcomd to the drive electrode COML belonging to the drive signal application block A1 and changes the voltage level thereof to the low level from the high level at a timing t11. With this, one horizontal period (1H) is finished and a subsequent period (1H) is started.

Then, the gate driver 12 applies a scan signal Vscan(h) to the scan signal lines GCL corresponding to a plurality of pixels Pix on one horizontal line of the h-th row contained in the drive signal application block A1 and changes a voltage level thereof to a high level from a low level at a timing t12. The source driver 13 applies the pixel signal Vpix to the pixel signal lines SGL and changes a voltage level thereof to a high level from a low level at the same timing t12. With this, the display operation on the pixels Pix on one horizontal line of the h-th row is started. In the embodiment, the display device with the touch detection function 1 executes the display operation by the line inversion driving, so that the polarity of the pixel signal Vpix applied from the source driver 13 is inverted from that in previous one horizontal period (1H).

Subsequently, the gate driver 12 changes the voltage level of the scan signal Vscan (h) applied to the scan signal line GCL corresponding to the pixels Pix on one horizontal line of the h-th row to the low level from the high level at a timing t13. With this, the display operation on the pixels Pix on one horizontal line of the h-th row is finished.

The display device with the touch detection function 1 in the embodiment repeats the above-mentioned operations so as to execute the display operation on the drive signal application block A1 on the screen GS. Next, as illustrated in FIG. 12, the drive electrode driver 14 applies the display drive signal Vcomd to the drive electrode COML belonging to the drive signal application block A2 in the display operation period Pd of a subsequent one block period (1B) and executes the display operation in the same manner as described above. Then, as illustrated in FIG. 13, the drive electrode driver 14 applies the display drive signal Vcomd to the drive electrode COML belonging to the drive signal application block A3 in the display operation period Pd of a subsequent one block period (1B) and executes the display operation in the same manner as described above. In this manner, the display device with the touch detection function 1 executes the above-mentioned display operation on the respective drive signal application blocks A1 to An while sequentially shifting the block to which the display drive signal Vcomd is applied to the lower side from the drive signal application block A1 as described above. With this, the display device with the touch detection function 1 executes the display operation on the entire screen GS.

Touch Detection Operation in Touch Detection Period Pt

Figure 15:
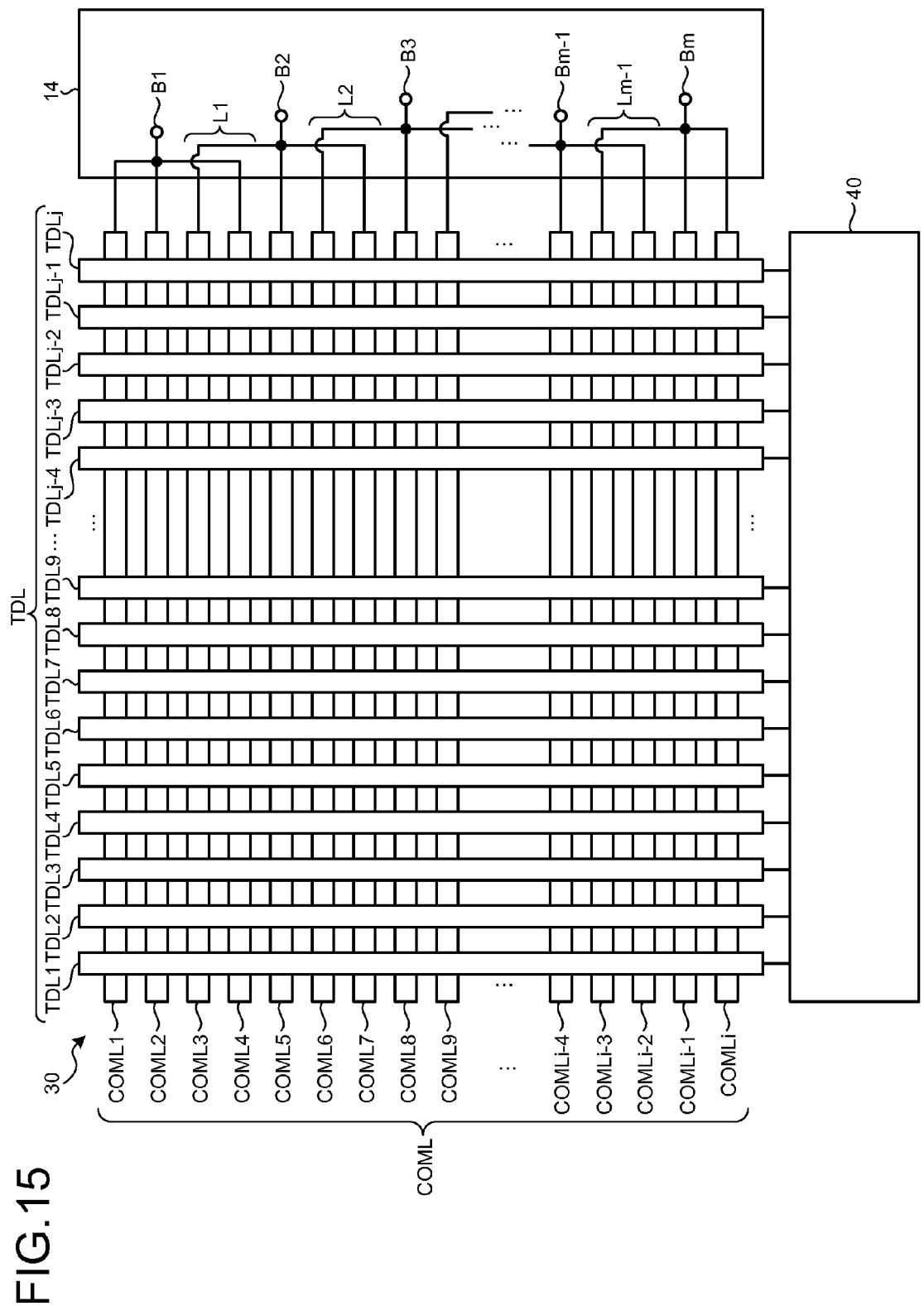
FIG. 15 is a view for explaining a setting operation and the configuration of drive signal application blocks when each drive signal application block is constituted by three drive electrodes in a touch detection device in the first embodiment of the present disclosure.
Figure 16:
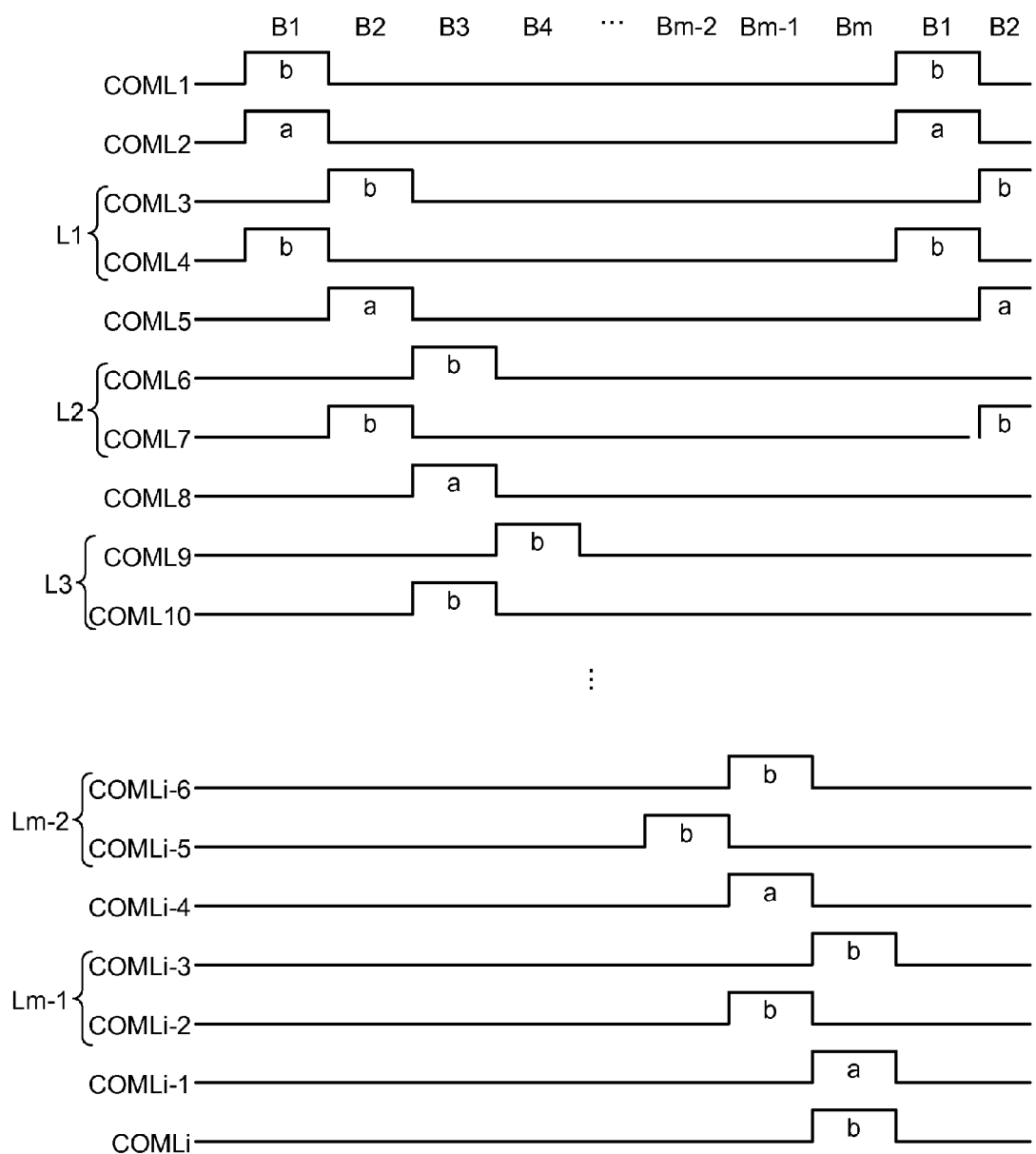
FIG. 16 is a diagram illustrating a state where a touch detection drive signal is applied to the drive electrodes constituting each drive signal application block as illustrated in FIG. 15.
Figure 17:
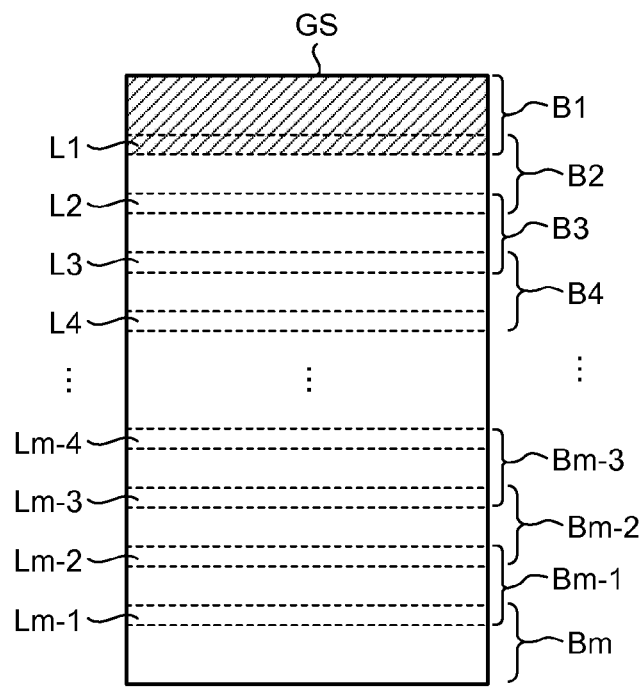
FIG. 17 is a view illustrating an example of operations of the drive electrode driver in a touch detection operation in the first embodiment of the present disclosure.
Figure 18:
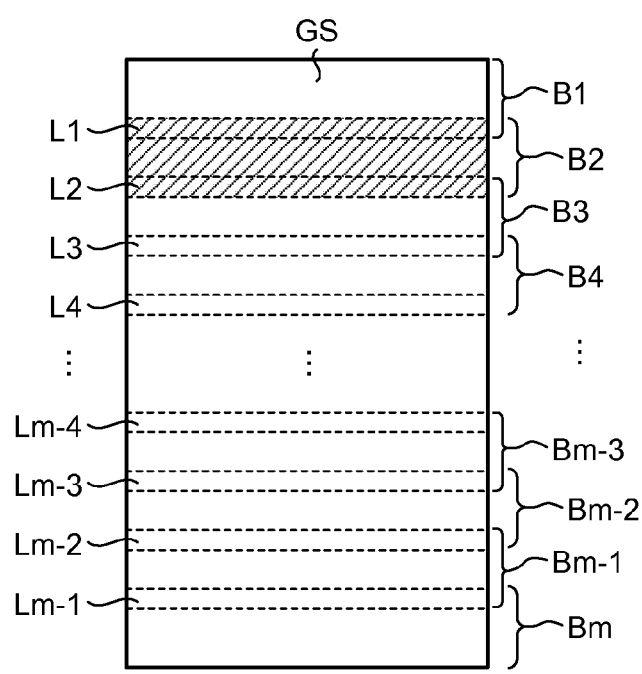
FIG. 18 is a view illustrating an example of the operations of the drive electrode driver in the touch detection operation in the first embodiment of the present disclosure.
Figure 19:
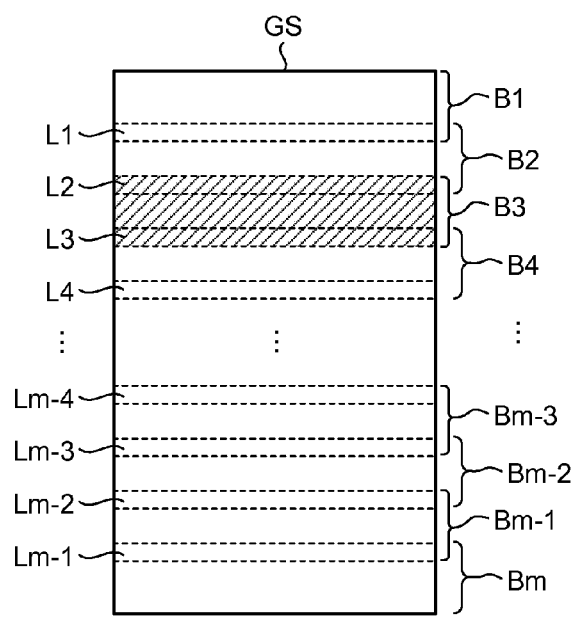
FIG. 19 is a view illustrating an example of the operations of the drive electrode driver in the touch detection operation in the first embodiment of the present disclosure.
Figure 20:
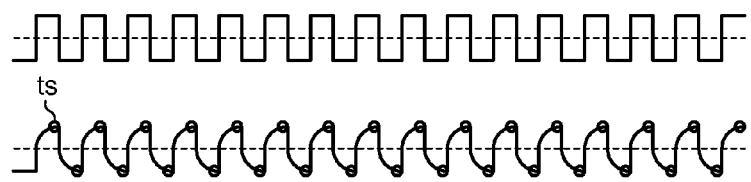
FIG. 20 is a diagram illustrating an example of timings of each signal in the touch detection period in the display device with the touch detection function in the first embodiment of the present disclosure.

FIG. 15 is a view for explaining a setting operation and the configuration of drive signal application blocks when each drive signal application block is constituted by three drive electrodes in the touch detection device in the first embodiment of the present disclosure. FIG. 16 is a diagram illustrating a state where a touch detection drive signal is applied to the drive electrodes constituting each drive signal application block as illustrated in FIG. 15. FIG. 17 to FIG. 19 are views illustrating an example of operations of the drive electrode driver in the touch detection operation in the first embodiment of the present disclosure. FIG. 20 is a diagram illustrating an example of timings of each signal in the touch detection period in the display device with the touch detection function in the first embodiment of the present disclosure. The touch detection operation in the display device with the touch detection function 1 in the embodiment in the touch detection period Pt will be described with reference to FIG. 15 to FIG. 20.

Each of the drive signal application blocks B1 to Bm of the touch detection device 30 as illustrated in FIG. 15 is constituted by at least three drive electrodes COML. The arrangement orders of the drive electrodes COML are changed such that an area of drive electrodes COML at the end sides in the parallel arrangement direction of the drive signal application blocks are swapped for an area of drive electrodes COML at the end side in the parallel arrangement direction of the adjacent drive signal application blocks. That is to say, portions in the drive signal application blocks adjacent to each other on which a part of the drive electrodes COML (single drive electrodes COML in FIG. 15) thereof at each of the end sides in the parallel arrangement direction are swapped can be considered as portions on which the adjacent drive signal application blocks are overlapped. As illustrated in FIG. 15, the overlapped portions are referred to as block overlapped portions L1, L2, . . . , and Lm−1 (drive block overlapped portions) in the order from the drive signal application block B1 side. For example, the overlapped portion where the drive signal application block B1 overlaps the drive signal application block B2 corresponds to the block overlapped portion L1 and the overlapped portion where the drive signal application block Bm−1 overlaps the drive signal application block Bm corresponds to the block overlapped portion Lm−1. The drive signal application blocks B1 and Bm are arranged at the end sides of a block group, respectively, so that the blocks adjacent to them are single blocks at only one of the end sides of each of the drive signal application blocks B1 and Bm and the overlapped portions thereof also correspond to portions at the only one of the end sides. The drive electrode driver 14 has a switching function of arbitrarily switching an electrical connection state among the drive electrodes COML therein. The drive electrodes COML1 to COMLi constituting the drive signal application blocks are electrically connected to one another by the switching function of the drive electrode driver 14 in the drive electrode driver 14 so as to form a predetermined electrode pattern (the number of drive electrodes COML contained in the same drive signal application block and a format of an arrangement interval between the drive electrodes COML).

FIG. 20 illustrates a waveform of the touch detection drive signal Vcomt and a waveform of the touch detection signal Vdet. Hereinafter, description is made in case that the specific drive signal application block B1 as illustrated in FIG. 17 among the drive signal application blocks B1 to Bm of the screen GS is set as a drive target.

Figure 22:
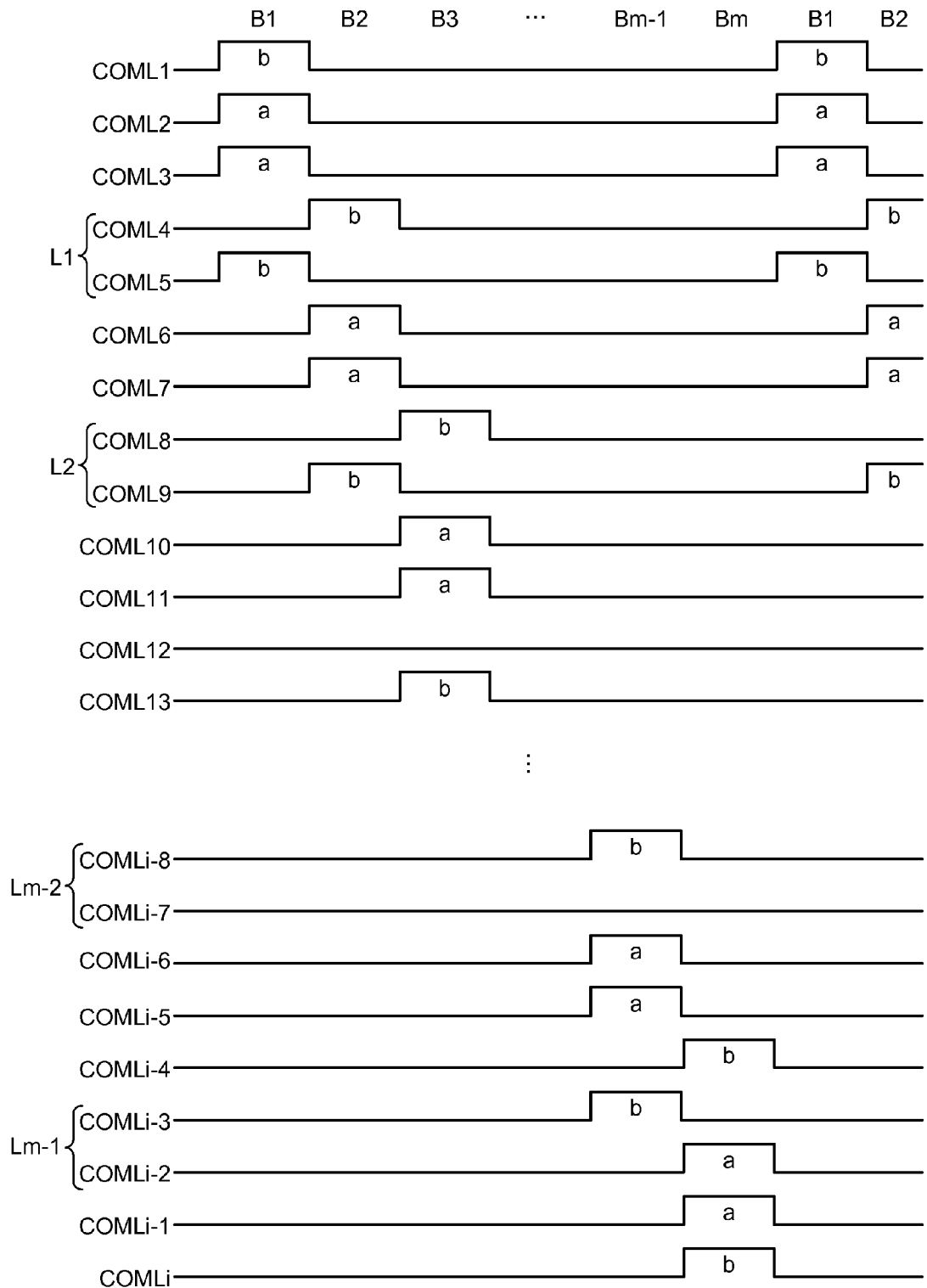
FIG. 22 is a diagram illustrating a state where a touch detection drive signal is applied to the drive electrodes constituting each drive signal application block as illustrated in FIG. 21.
Figure 23:
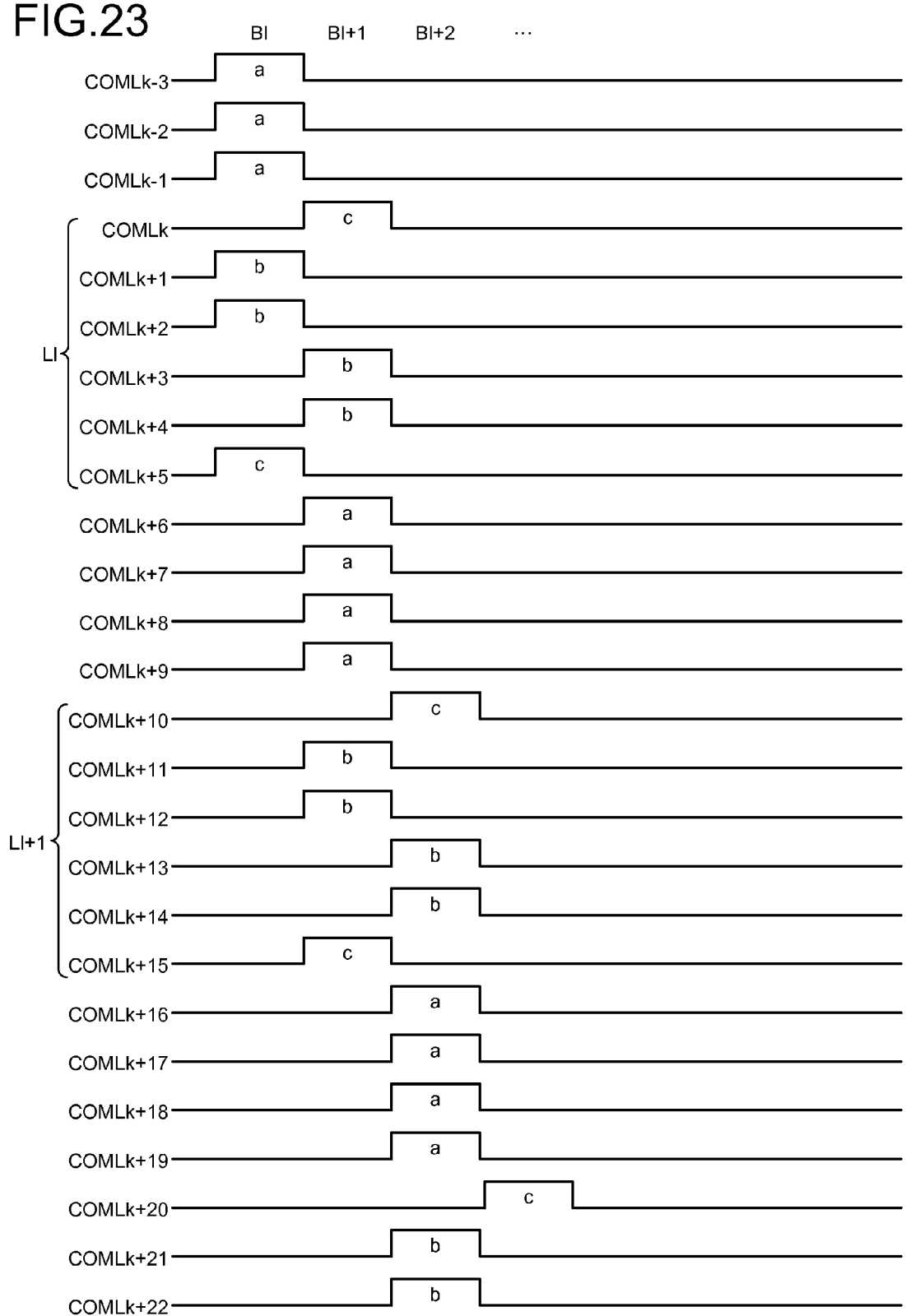
FIG. 23 is a diagram illustrating a state where a touch detection drive signal is applied to drive electrodes constituting each drive signal application block when each drive signal application block is constituted by ten drive electrodes in a touch detection device according a second modification of the first embodiment of the present disclosure.

The drive electrode driver 14 applies the touch detection drive signal Vcomt to the drive electrodes COML belonging to the drive signal application block B1. To be specific, as illustrated in FIG. 16, the drive electrode driver 14 applies the touch detection drive signal Vcomt to the drive electrodes COML1, COML2, and COML4 belonging to the drive signal application block B1. The square waveforms for each drive electrode COML as illustrated in FIG. 16, and FIG. 22 and FIG. 23, which will be referred later, do not indicate waveforms of the actual touch detection drive signal Vcomt but indicate a state where the touch detection drive signal Vcomt as illustrated in FIG. 20 is applied. The frequency of the touch detection drive signal Vcomt is desirably higher than the frequency of the display drive signal Vcomd in the display operation period Pd.

The touch detection drive signal Vcomt applied to the drive electrodes COML belonging to the drive signal application block B1 is transmitted to the touch detection electrodes TDL trough the electrostatic capacitances and the touch detection signals Vdet change.

Then, the A/D converter 43 of the touch detection unit 40 A/D-converts the analog signals as the touch detection signals Vdet amplified by the signal amplification unit 42 at a sampling timing ts (see FIG. 20) synchronized with the touch detection drive signal Vcomt (or sampling frequency higher than that corresponding to the sampling timing ts).

Thus, the frequency of the touch detection drive signal Vcomt in the touch detection period Pt is made higher than the frequency of the display drive signal Vcomd in the display operation period Pd and the A/D converter 43 samples the touch detection signals Vdet at the sampling timing ts synchronized with the touch detection drive signal Vcomt (or at a sampling frequency higher than that corresponding to the sampling timing ts). With this, the touch detection signals Vdet are sampled at the higher frequency than that in the case where the display drive signal Vcomd is applied to the drive signal application block B1 and the touch detection signals Vdet are sampled at the timing synchronized with the display drive signal Vcomd, thereby reducing noise components. Accordingly, for example, even when external noise is transmitted to the touch detection device 30, noise components appearing on the output from the A/D converter 43 due to the external noise can be reduced. The operations are executed in the display operation period Pd and the touch detection period Pt separately so as to contribute in noise reduction. That is to say, the display device with the touch detection function 1 can reduce influence by the external noise on the touch detection operation.

Thereafter, the signal processor 44 determines presence and absence of touch detection on the drive signal application block B1 on the screen GS based on the digital signals that have been A/D-converted and output by the A/D converter 43. As a method of determining presence and absence of the touch detection, determination is made based on a threshold as described above with reference to FIG. 6, for example.

Subsequently, as illustrated in FIG. 18, the drive electrode driver 14 applies the touch detection drive signal Vcomt to the drive electrodes COML (drive electrodes COML3, COML5, and COML7) belonging to the drive signal application block B2 in the touch detection period Pt of a subsequent one block period (1B). Then, the touch detection unit 40 detects the touch detection signals Vdet changed by the touch detection drive signal Vcomt and determines presence and absence of the touch detection on the drive signal application block B2 on the screen Gs based on the digital signals obtained by A/D-converting the touch detection signals Vdet as described above.

In the above-mentioned manner, as results of determination of presence and absence of the touch detection on the drive signal application blocks B1 and B2 by the touch detection unit 40, three types of touch detection states are determined in the parallel arrangement direction of the drive electrodes COML, including the case where a touch has been detected on the drive signal application block B1 only, the case where a touch has been detected on the drive signal application block B1 and the drive signal application block B2, and the case where a touch has been detected on the drive signal application block B2 only. The case where a touch has been detected on the drive signal application block B1 only indicates the case where a touch has been detected on a portion corresponding to the drive electrode COML1 or the drive electrode COML2 in the drive signal application block B1 as illustrated in FIG. 15 and FIG. 16. That is to say, it indicates the case where a touch has been detected on the drive electrode COML1 or the drive electrode COML2 in a state where the touch detection drive signal Vcomt is applied to the drive electrode COML1 as indicated by a square waveform b and the touch detection drive signal Vcomt is applied to the drive electrode COML2 as indicated by a square waveform a.

The case where a touch has been detected on the drive signal application block B1 and the drive signal application block B2 indicates the case where a touch has been detected on a portion corresponding to the drive electrode COML4 in the drive signal application block B1 and the drive electrode COML3 in the drive signal application block B2, that is, on the block overlapped portion L1 as illustrated in FIG. 15 and FIG. 16. That is to say, it indicates the case where a touch has been detected on the drive electrodes COML3 and COML4 in a state where the touch detection drive signal Vcomt is applied to the drive electrode COML4 as indicated by the square waveform b and the touch detection drive signal Vcomt is applied to the drive electrode COML3 as indicated by the square waveform b.

The case where a touch has been detected on the drive signal application block B2 only indicates the case where a touch has been detected on a portion corresponding to the drive electrode COML5 in the drive signal application block B2 as illustrated in FIG. 15 and FIG. 16. That is to say, it indicates the case where a touch has been detected on the drive electrode COML5 in a state where the touch detection drive signal Vcomt is applied to the drive electrode COML5 as indicated by the square waveform a.

Subsequently, as illustrated in FIG. 19, the drive electrode driver 14 applies the touch detection drive signal Vcomt to the drive electrodes COML (drive electrodes COML6, COML8, and COML10) belonging to the drive signal application block B3 in the touch detection period Pt of a subsequent one block period (1B). Then, the touch detection unit 40 detects the touch detection signals Vdet changed by the touch detection drive signal Vcomt and determines presence and absence of the touch detection on the drive signal application block B3 on the screen Gs based on the digital signals obtained by A/D-converting the touch detection signals Vdet as described above.

In the above-mentioned manner, as results of determination of presence and absence of the touch detection on the drive signal application blocks B2 and B3 by the touch detection unit 40, three types of touch detection states are determined in the parallel arrangement direction of the drive electrodes COML, including the case where a touch has been detected on the drive signal application block B2 only, the case where a touch has been detected on the drive signal application block B2 and the drive signal application block B3, and the case where a touch has been detected on the drive signal application block B3 only. The case where a touch has been detected on the drive signal application block B2 only indicates the case where a touch has been detected on the portion corresponding to the drive electrode COML5 in the drive signal application block B2 as illustrated in FIG. 15 and FIG. 16. That is to say, it indicates the case where a touch has been detected on the drive electrode COML5 in the state where the touch detection drive signal Vcomt is applied to the drive electrode COML5 as indicated by the square waveform a.

The case where a touch has been detected on the drive signal application block B2 and the drive signal application block B3 indicates the case where a touch has been detected on a portion corresponding to the drive electrode COML7 in the drive signal application block B2 and the drive electrode COML6 in the drive signal application block B3, that is, on the block overlapped portion L2 as illustrated in FIG. 15 and FIG. 16. That is to say, it indicates the case where a touch has been detected on the drive electrodes COML6 and COML7 in a state where the touch detection drive signal Vcomt is applied to the drive electrodes COML6 and COML7 as indicated by the square waveform b.

The case where a touch has been detected on the drive signal application block B3 only indicates the case where a touch has been detected on a portion corresponding to the drive electrode COML8 in the drive signal application block B3 as illustrated in FIG. 15 and FIG. 16. That is to say, it indicates the case where a touch has been detected on the drive electrode COML8 in a state where the touch detection drive signal Vcomt is applied to the drive electrode COML8 as indicated by the square waveform a.

In this manner, the display device with the touch detection function 1 executes the display operation on the drive signal application blocks B1 to Bm while sequentially shifting the block to which the touch detection drive signal Vcomt is applied to the lower side from the drive signal application block B1 as described above. With this, the display device with the touch detection function 1 executes the touch detection operation on the entire screen GS. The touch detection operation is executed on the drive signal application blocks as described above so as to execute the touch detection operation including the touch detection on the drive signal application block B1 only, the touch detection on the block overlapped portion L1, the touch detection on the drive signal application block B2 only, the touch detection on the block overlapped portion L2, . . . , and the touch detection on the drive signal application block Bm only. Accordingly, touch detection can be executed not for each drive signal application block but for each smaller region, thereby improving the accuracy of the position detection of the touch operation with the external object in the parallel arrangement direction of the drive electrodes COML. The scanning time of the entire screen when the block overlapped portions are provided can be made equivalent to the scanning time when the drive electrode driver sequentially applies the touch detection drive signal Vcomt to each of the blocks normally without providing the block overlapped portions. The scanning time of entire screen can be reduced in comparison with the case where the drive electrode driver sequentially applies the touch detection drive signal Vcomt for each of the drive electrodes COML.

Although the respective drive electrodes COML constituting the electrode patterns in the drive signal application blocks B1 to Bm are electrically connected to one another by the switching function of the drive electrode driver 14 as illustrated in FIG. 15, the disclosure is not limited thereto. That is to say, the respective drive electrodes COML constituting the electrode patterns in the drive signal application blocks B1 to Bm may be electrically connected to one another outside the drive electrode driver 14.

The number of drive signal application blocks A1 to An that are divided in the display operation period Pd and the number of drive signal application blocks B1 to Bm that are divided in the touch detection period Pt on the screen GS may not be the same.

As described above, the display device with the touch detection function 1 executes the touch detection operation on the respective drive signal application blocks B1 to Bm while sequentially shifting the block to which the touch detection drive signal Vcomt is applied to the lower side from the drive signal application block B1 in the touch detection period Pt. In this case, the touch detection can be executed not for each drive signal application block but for each smaller region by providing the block overlapped portions of the adjacent drive signal application blocks. This can improve the accuracy of the position detection of the touch operation with the external object in the parallel arrangement direction of the drive electrodes COML. When not the finger of a user but an external object having a sharpened tip, such as a stylus, is used, application of the touch detection drive signal Vcomt for each of the drive electrodes COML for scanning is more preferable than the touch detection for each drive signal application block in some cases from a viewpoint of ensuring the accuracy of the position detection. In this case, the drive electrode driver 14 can electrically connect an arbitrary combination of the drive electrodes COML by the switching function as described above. Accordingly, the drive electrode driver 14 may switch to execute the touch detection for each drive signal application block when a touch with the finger is detected and switch to execute the touch detection for each drive electrode COML when a touch with the stylus or the like is detected.

The examples of a method of determining whether a detected touch is a touch with the finger or a touch with the stylus or the like include, but are not limited to, the following method. That is to say, when the touch detection unit 40 detects a touch on the touch detection electrodes TDL of equal to or more than the predetermined number, it is determined that the detected touch is a touch with the finger and the drive electrode driver 14 switches to execute the touch detection for each drive signal application block. On the other hand, when the touch detection unit 40 detects a touch on the touch detection electrodes TDL of less than the predetermined number, it is determined that the detected touch is a touch with the stylus or the like and the drive electrode driver 14 switches to execute the touch detection for each drive electrode COML. The method of determining whether the detected touch is a touch with the finger or a touch with the stylus or the like is not limited to the above-mentioned method.

Although the finger and the stylus or the like are used as the examples of the external object and the execution of the touch detection for each the drive signal application block and the execution of the touch detection for each the drive electrode COML are switched, the disclosure is not limited thereto. That is to say, the drive electrode driver 14 may change the number of drive electrodes COML constituting each drive signal application block based on the number of touch detection electrodes TDL on which the touch detection unit 40 has detected a touch.

In other words, the drive electrode driver 14 may change at least one of the number of drive electrodes COML constituting each of the drive signal application blocks B1 to Bm and an electrode pattern of the drive electrodes COML constituting each of the drive signal application blocks B1 to Bm based on the external object (e.g. a size of the external object) detected by the touch detection unit 40 or the number of the touch detection electrodes TDL on which the touch detection unit 40 has detected a touch.

It is desirable that the numbers of drive electrodes COML in the respective drive signal application blocks B1 to Bm to be switched by the drive electrode driver 14 are set to be the same and the electrode patterns other than those in the drive signal application blocks B1 and Bm are made uniform. This can reduce generation of variation in the accuracy of the position detection of the touch operation with the external object.

First Modification of First Embodiment

Figure 21:
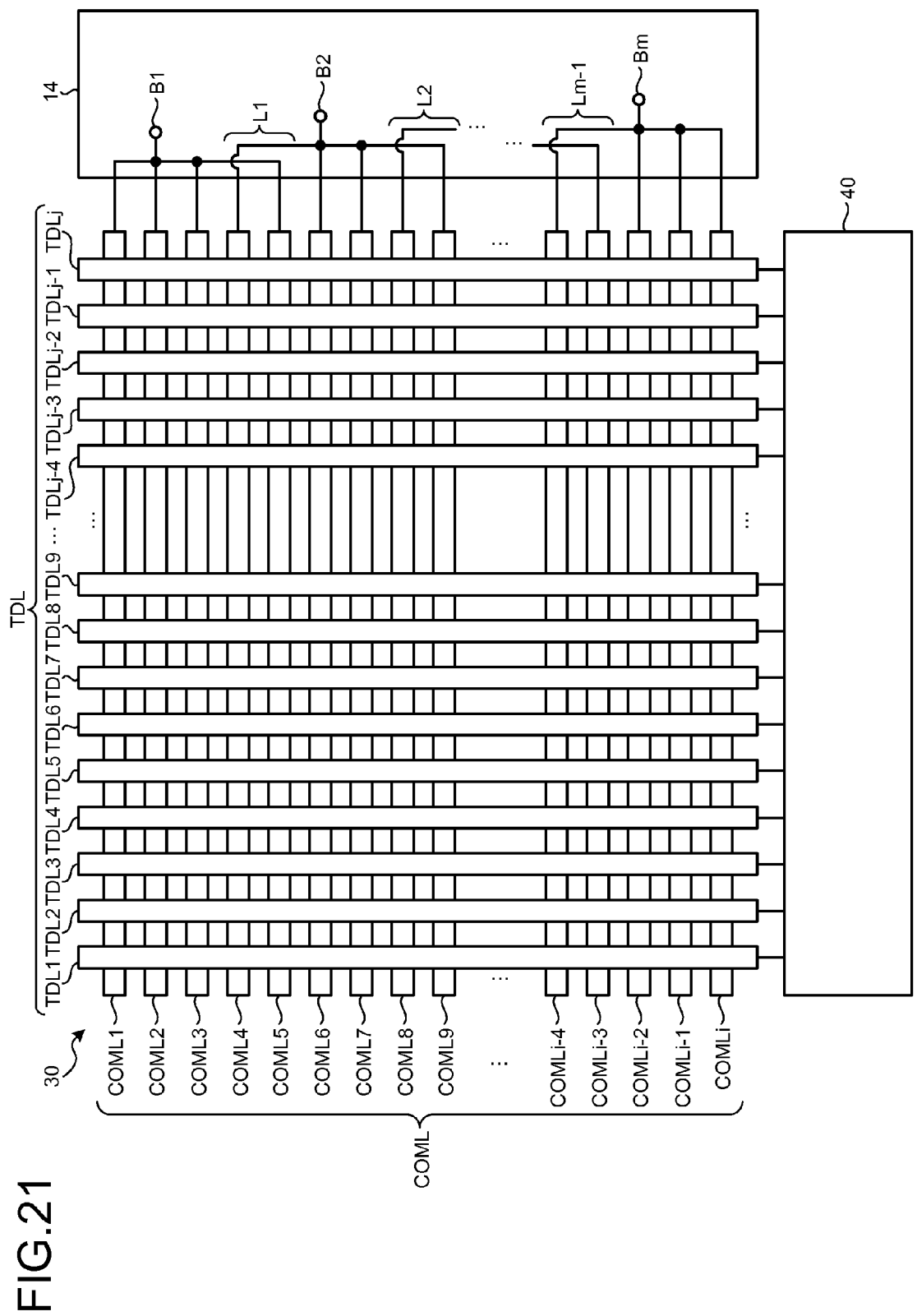
FIG. 21 is a view for explaining a setting operation and the configuration of drive signal application blocks when each drive signal application block is constituted by four drive electrodes in a touch detection device according a first modification of the first embodiment of the present disclosure.

FIG. 21 is a view for explaining a setting operation and the configuration of drive signal application blocks when each drive signal application block is constituted by four drive electrodes in a touch detection device according a first modification of the first embodiment of the present disclosure. FIG. 22 is a diagram illustrating a state where the touch detection drive signal is applied to the drive electrodes constituting each drive signal application block as illustrated in FIG. 21.

Each of the drive signal application blocks B1 to Bm of the touch detection device 30 as illustrated in FIG. 21 is constituted by four drive electrodes COML. The arrangement orders of the drive electrodes COML are changed such that an area of drive electrodes COML at the end sides in the parallel arrangement direction of the drive signal application blocks are swapped for an area of drive electrodes COML at the end sides in the parallel arrangement direction of the adjacent drive signal application blocks. That is to say, as in the touch detection device 30 as illustrated in FIG. 15, portions in the drive signal application blocks adjacent to each other on which some drive electrodes COML (single drive electrodes COML in FIG. 21) thereof at the end sides in the parallel arrangement direction are swapped can be considered as portions (block overlapped portions L1, L2, . . . , and Lm−1) on which the adjacent drive signal application blocks are overlapped.

As illustrated in FIG. 22, in the touch detection device 30 in which each of the drive signal application blocks B1 to Bm is constituted by four drive electrodes COML, the drive electrodes COML on a portion on which a touch is detected in each drive signal application block only correspond to adjacent two drive electrodes COML. For example, when a touch is detected on the drive signal application block B2 only, a touch is detected on a portion corresponding to the adjacent drive electrodes COML6 and COML7 of which application states of the touch detection drive signal Vcomt are indicated by a square waveform a, as illustrated in FIG. 22. In general, when the touch detection drive signal Vcomt is applied to the adjacent drive electrodes COML, the above-mentioned absolute value |ΔV| based on the touch detection signals Vdet appearing on the opposing touch detection electrodes TDL is increased. In other words, sensitivity of touch detection on the adjacent drive electrodes COML is increased. Accordingly, as in the touch detection device 30 as illustrated in FIG. 15, the accuracy of position detection of the touch operation with the external object in the parallel arrangement direction of the drive electrodes COML can be improved and the sensitivity when a touch is detected on the respective drive signal application blocks only can be improved.

Second Modification of First Embodiment

FIG. 23 is a diagram illustrating a state where the touch detection drive signal is applied to the drive electrodes constituting each drive signal application block when each drive signal application block is constituted by ten drive electrodes in a touch detection device according a second modification of the first embodiment of the present disclosure.

FIG. 23 illustrates a state where the touch detection drive signal Vcomt is applied to drive signal application blocks B1, B1+1, and B1+2 among the drive signal application blocks B1 to Bm. As illustrated in FIG. 23, for example, a drive electrode COMLk+10 of which application state is indicated by a square waveform c in the drive signal application block B1+2 is arranged between drive electrodes COMLk+6 to COMLk+9 of which application states are indicated by a square waveform a and drive electrodes COMLk+11 and COMLk+12 of which application states are indicated by a square waveform b in the drive signal application block B1+1. Drive electrodes COMLk+13 and COMLk+14 of which application states are indicated by the square waveform b in the drive signal application block B1+2 are arranged between the drive electrodes COMLk+11 and COMLk+12 of which application states are indicated by the square waveform b and a drive electrode COMLk+15 of which application state is indicated by the square waveform c in the drive signal application block B1+1. The drive electrodes COML of which application states are indicated by the square waveform a in each of the drive signal application blocks B1+1 and B1+2 include four adjacent drive electrodes COML. As described above, in the touch detection device as illustrated in FIG. 23, the arrangement orders of the drive electrodes COML are changed such that the drive electrodes COML of the adjacent drive signal application blocks at the end sides are swapped at a plurality of stages. Portions (drive electrodes COML k+10 to COML k+15) of the adjacent drive signal application blocks B1+1 and B1+2 on which the drive electrodes COML are swapped at the stages can be considered as an overlapped portion (block overlapped portion L1+1).

The electrode patterns and the block overlapped portions in the drive signal application blocks are configured in the above-mentioned mode. As in the touch detection device 30 as illustrated in FIG. 15 and FIG. 21, the drive signal application blocks B1 and Bm are blocks arranged at the end sides of a block group, respectively, so that the blocks adjacent to them are single blocks at only one of the end sides of each of the drive signal application blocks B1 and Bm and the overlapped portions thereof also correspond to portions at the only one of the end sides.

In this manner, the drive electrodes COML are swapped at the stages in the block overlapped portions in the drive signal application blocks B1 to Bm of the touch detection device as illustrated in FIG. 23 and the block overlapped portions contain the adjacent drive electrodes COML (drive electrodes COML of which application states are indicated by the square waveform b as illustrated in FIG. 23) belonging to the same drive signal application blocks. This can improve the accuracy of position detection of the touch operation with the external object in the parallel arrangement direction of the drive electrodes COML and the sensitivity when a touch is detected on the block overlapped portions. In order to obtain the above-mentioned advantages, the areas of the drive electrodes COML of the adjacent drive signal application blocks are not necessarily required to be swapped at the stages in the block overlapped portions. That is to say, the configuration in which the block overlapped portions contain the adjacent drive electrodes COML belonging to the same drive signal application blocks can provide the above-mentioned advantages.

Although the touch detection devices in which each of the drive signal application blocks is constituted by three, four, and ten drive electrodes COML have been described in FIG. 15, FIG. 21, and FIG. 23, respectively, it is needless to say that the number of drive electrodes COML constituting each drive signal application block is not limited thereto.

Third Modification of First Embodiment

Figure 24:
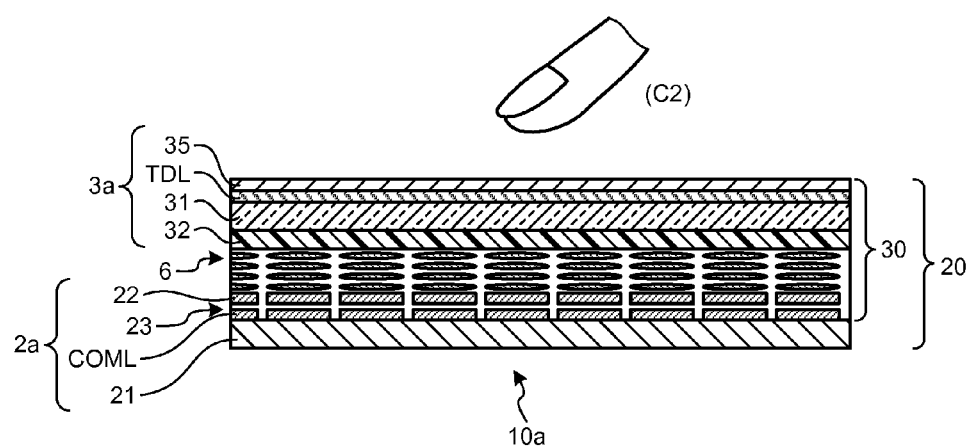
FIG. 24 is a schematic cross-sectional view illustrating a display unit with a touch detection function according a third modification of the first embodiment of the present disclosure.

FIG. 24 is a schematic cross-sectional view illustrating a display unit with a touch detection function according a third modification of the first embodiment of the present disclosure.

The display unit with the touch detection function 10 of the above-mentioned display device with the touch detection function 1 employs the TN mode, the VA mode, the OCB mode, or the like as the drive system in the liquid crystal layer 6. Instead of these modes, a liquid crystal drive system of a horizontal electric field mode may be employed as in a display unit with a touch detection function 10a of the display device with the touch detection function as illustrated in FIG. 24. As the horizontal electric field mode, a drive system of an in-plane switching (IPS) mode, a fringe field switching (FFS) mode, or the like is used. The display unit with the touch detection function 10a as illustrated in FIG. 24 has a configuration in which a liquid crystal layer 6a is interposed between a pixel substrate 2a and a counter substrate 3a. The display unit with the touch detection function 10a is different from the display unit with the touch detection function 10 as illustrated in FIG. 7. In the display unit with the touch detection function 10a, the drive electrodes COML used for both of the display operation and the touch detection operation are arranged on the surface of the TFT substrate 21 at the liquid crystal layer 6a side and constitute a part of the pixel substrate 2a. The pixel electrodes 22 are arranged on the drive electrodes COML at the liquid crystal layer 6a side through an insulating layer 23. In this case, all the members including the liquid crystal layer 6 between the drive electrodes COML and the touch detection electrodes TDL contribute to formation of the capacitive element C1. Other configurations and functions of the respective parts are the same as those in the display unit with the touch detection function 10 as illustrated in FIG. 7.

As described above, the configuration of the display unit with the touch detection function 10a as illustrated in FIG. 24 can provide advantages obtained in the above-mentioned embodiment.

Although the display unit with the touch detection function 10 as illustrated in FIG. 7 and the display unit with the touch detection function 10a as illustrated in FIG. 24 are of what-is-called in-cell type in which the liquid crystal display unit 20 and the touch detection device 30 are integrated, the disclosure is not limited thereto. For example, the electrostatic capacitance type touch detection device may be mounted to the liquid crystal display unit. When this configuration is employed, the liquid crystal display unit 20 and the touch detection device 30 do not share the drive electrodes and the drive electrodes are arranged on each of the liquid crystal display unit and the touch detection device. Even this configuration can provide the same advantages by employing the above-mentioned operations. The drive electrodes arranged on the above-mentioned liquid crystal display unit correspond to a "first drive electrode" according to the disclosure and the drive electrodes arranged on the touch detection device correspond to a "second drive electrode" according to the disclosure.

2. Second Embodiment

A display device with a touch detection function 1a according to a second embodiment will be described while mainly focusing on points different from the configuration of the display device with the touch detection function 1 according to the first embodiment. The overall configuration of the display device with the touch detection function 1a in the second embodiment is the same as that of the display device with the touch detection function 1 in the first embodiment other than the configuration of the electrode pattern of the touch detection electrodes TDL, and operations thereof are also the same as those in the display device with the touch detection function 1 in the first embodiment.

Touch Detection Operation in Touch Detection Period Pt

Figure 25:
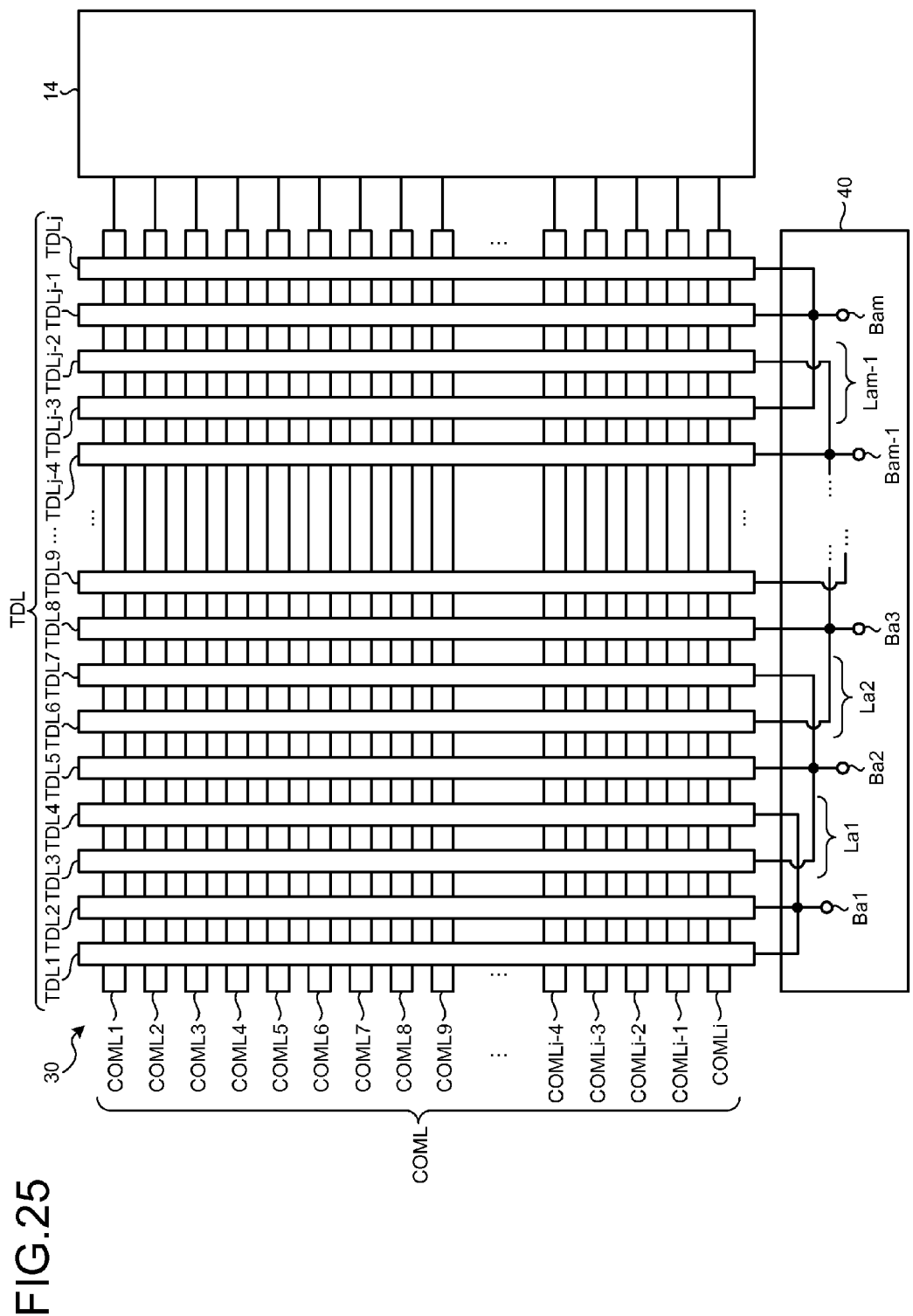
FIG. 25 is a view for explaining a setting operation and the configuration of touch detection signal detection blocks when each touch detection signal detection block is constituted by three touch detection electrodes in a touch detection device according a second embodiment of the present disclosure.

FIG. 25 is a view for explaining a setting operation and the configuration of touch detection signal detection blocks when each touch detection signal detection block is constituted by three touch detection electrodes in the touch detection device according the second embodiment of the present disclosure. The touch detection operation in the display device with the touch detection function 1a in the embodiment in the touch detection period Pt will be described with reference to FIG. 25.

Each of touch detection signal detection blocks Ba1 to Bam of the touch detection device 30 of the display device with the touch detection function 1a as illustrated in FIG. 25 is constituted by three touch detection electrodes TDL. The arrangement orders of the touch detection electrodes TDL are changed such that touch detection electrodes TDL at the end sides in the parallel arrangement direction of the touch detection signal detection blocks are switched with touch detection electrodes TDL at the end side of the adjacent touch detection signal detection blocks. That is to say, portions of the touch detection signal detection blocks adjacent to each other on which areas of some touch detection electrodes TDL (single touch detection electrodes TDL in FIG. 25) thereof at the end sides are swapped can be considered as portions on which the adjacent touch detection signal detection blocks are overlapped. As illustrated in FIG. 25, the overlapped portions are referred to as block overlapped portions La1, La2, . . . , Lam−1 (detection block overlapped portions) in the order from the touch detection signal detection block Ba1 side. For example, the overlapped portion where the touch detection signal detection block Ba1 overlaps the touch detection signal detection block Ba2 corresponds to the block overlapped portion La1 and the overlapped portion where the touch detection signal detection block Bam−1 overlaps the touch detection signal detection block Bam corresponds to the block overlapped portion Lam−1. The touch detection signal detection blocks Ba1 and Bam are arranged at the end sides of a block group, respectively, so that the blocks adjacent to them are single blocks at only one of the end sides of each of the touch detection signal detection blocks Ba1 and Bam and the overlapped portions thereof also correspond to portions at the only one of the end sides.

The signal amplification unit 42 of the touch detection unit 40 to which the touch detection electrodes TDL are coupled has the switching function for the respective touch detection electrodes TDL that is the same as that of the drive electrode driver 14. The touch detection electrodes TDL1 to TDLj constituting the respective touch detection signal detection blocks are electrically connected to one another by the switching function of the signal amplification unit 42 in the signal amplification unit 42 so as to form a predetermined electrode pattern (the number of touch detection electrodes TDL contained in the same touch detection signal detection block and a format of an arrangement interval between the touch detection electrodes TDL). The above-mentioned switching function is not required to be included in the signal amplification unit 42 and a switching processing unit may be provided in the touch detection unit 40 at the previous stage of the signal amplification unit 42 and the switching processing unit may have the above-mentioned switching function.

The display device with the touch detection function 1a in the embodiment executes the touch detection operation on the entire screen GS while sequentially shifting the block to which the touch detection drive signal Vcomt is applied to the lower side from the drive signal application block B1 in the same manner as that in the display device with the touch detection function 1 in the first embodiment. In this case, as described above, touch detection is performed on the drive signal application block B1 only, the block overlapped portion L1, the drive signal application block B2 only, the block overlapped portion L2, . . . , and the drive signal application block Bm only in the parallel arrangement direction of the drive electrodes COML. In the embodiment, touch detection is performed for each touch detection signal detection block in the parallel arrangement direction of the touch detection electrodes TDL. In general, the above-mentioned absolute value |ΔV| based on the touch detection signals Vdet appearing on the blocked touch detection electrodes TDL is increased. In other words, sensitivity of touch detection on the blocked touch detection electrodes TDL is increased. This can improve the sensitivity of touch detection in the parallel arrangement direction of the touch detection electrodes TDL.

Areas of some touch detection electrodes TDL in the adjacent touch detection signal detection blocks at the end sides are swapped so as to form the block overlapped portions in the same manner as the drive electrodes COML. That is to say, the touch detection operations including touch detection on the touch detection signal detection block Ba1 only, touch detection on the block overlapped portion La1, touch detection on the touch detection signal detection block Ba2 only, touch detection on the block overlapped portion La2, . . . , and touch detection on the touch detection signal detection block Bam only can be executed. This can ensure the accuracy of position detection of the touch operation with the external object in the parallel arrangement direction of the touch detection electrodes TDL.

Although the respective touch detection electrodes TDL constituting the electrode patterns of the touch detection signal detection blocks Ba1 to Bam are electrically connected to one another by the switching function of the signal amplification unit 42 in the signal amplification unit 42 as illustrated in FIG. 25, the disclosure is not limited thereto. That is to say, the respective touch detection electrodes TDL constituting the electrode pattern of the touch detection signal detection blocks Ba1 to Bam may be electrically connected to one another outside the signal amplification unit 42.

The number of drive signal application blocks B1 to Bm and the number of touch detection signal detection blocks Ba1 to Bam that are divided in the touch detection period Pt in the screen GS may not be the same.

As described above, the touch detection device 30 can execute touch detection not for each touch detection signal detection block but for each smaller region by providing the block overlapped portions in the adjacent touch detection signal detection blocks. This can improve the accuracy of the position detection of the touch operation with the external object in the parallel arrangement direction of the touch detection electrodes TDL. When not the finger of a user but the external object having the sharpened front, such as the stylus is used, the detection for each touch detection electrode TDL is more preferable than the detection for each touch detection signal detection block in some cases from a viewpoint of ensuring the accuracy of the position detection. In this case, the signal amplification unit 42 can electrically connect an arbitrary combination of the touch detection electrodes TDL by the switching function as described above. Accordingly, the signal amplification unit 42 may switch to execute the touch detection for each touch detection signal detection block when a touch with the finger is detected and switch to execute the touch detection for each touch detection electrode TDL when a touch with the stylus or the like is detected.

Although the finger and the stylus or the like are used as the examples of the external object and the execution of the touch detection for each touch detection signal detection block and the execution of the touch detection for each touch detection electrode TDL are switched, the disclosure is not limited thereto. That is to say, the signal amplification unit 42 may change the number of touch detection electrodes TDL constituting each touch detection signal detection block in accordance with the touch-detected external object.

In other words, the touch detection unit may change at least one of the number of touch detection electrodes TDL constituting each of the touch detection signal detection blocks Ba1 to Bam and an electrode pattern of the touch detection electrodes TDL constituting each of the touch detection signal detection blocks Ba1 to Bam based on the external object (e.g. a size of the external object) detected by the touch detection unit 40 or the number of the touch detection electrodes TDL on which the touch detection unit 40 has detected a touch.

It is desirable that the numbers of touch detection electrodes TDL in the respective touch detection signal detection blocks Ba1 to Bam to be switched by the signal amplification unit 42 are set to be the same and the electrode patterns other than those of the touch detection signal detection blocks Ba1 and Bam are made uniform. This can reduce generation of variation in the accuracy of the position detection of the touch operation with the external object.

Modification of Second Embodiment

Figure 26:
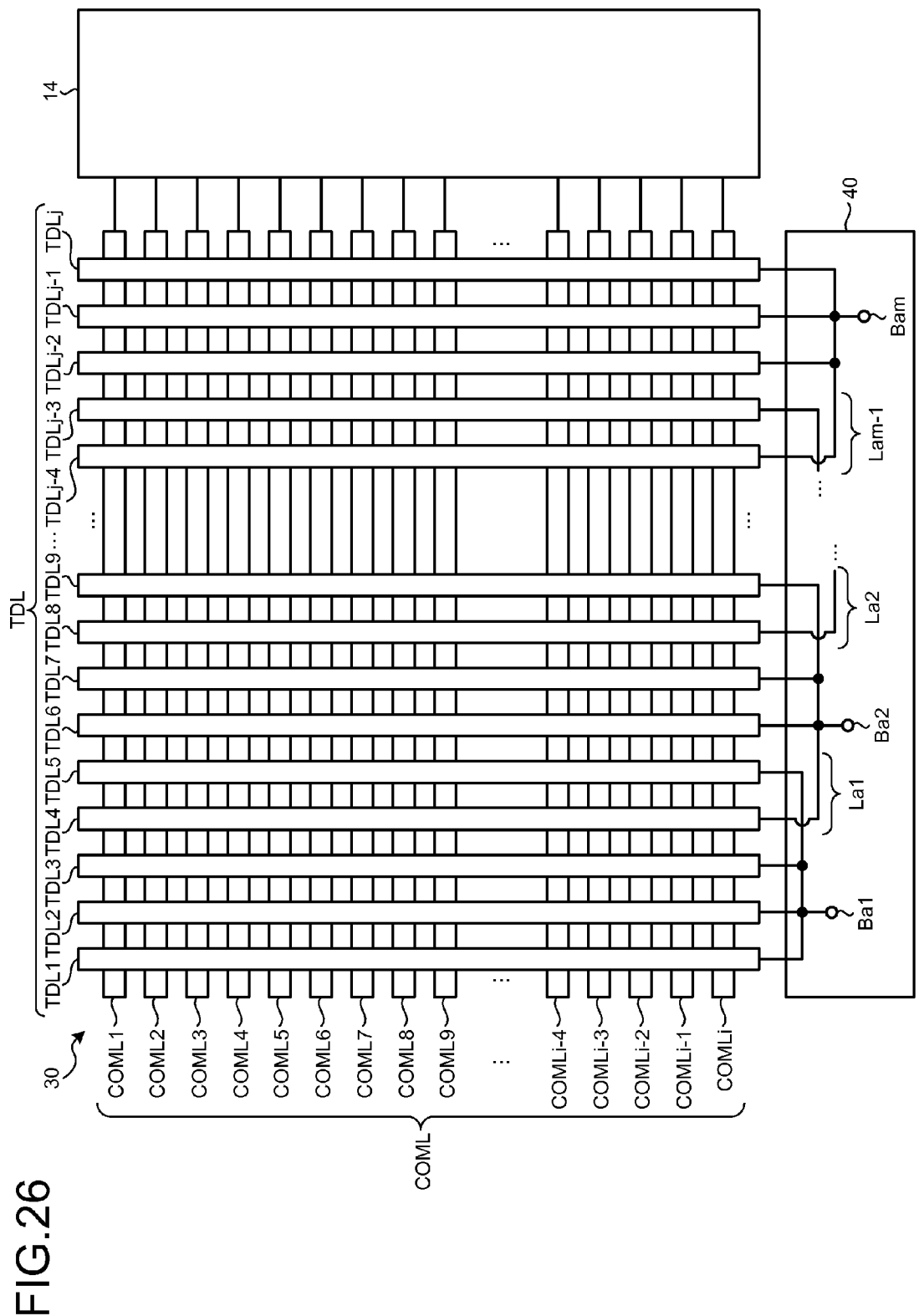
FIG. 26 is a view for explaining a setting operation and the configuration of touch detection signal detection blocks when each touch detection signal detection block is constituted by four touch detection electrodes in a touch detection device according to a modification of the second embodiment of the present disclosure.

FIG. 26 is a view for explaining a setting operation and the configuration of four touch detection signal detection blocks in a touch detection device according to a modification of the second embodiment of the present disclosure.

Each of the touch detection signal detection blocks Ba1 to Bam of the touch detection device 30 as illustrated in FIG. 26 is constituted by four touch detection electrodes TDL. The arrangement orders of the touch detection electrodes TDL are changed such that touch detection electrodes TDL at the end sides in the parallel arrangement direction of the touch detection signal detection blocks are switched with touch detection electrodes TDL at the end side of the adjacent touch detection signal detection blocks. That is to say, as in the touch detection device 30 as illustrated in FIG. 25, portions of the touch detection signal detection blocks adjacent to each other on which some touch detection electrodes TDL (single touch detection electrodes TDL in FIG. 26) thereof at the end sides are switched can be considered as portions (block overlapped portion La1, La2, . . . , and Lam−1) on which the adjacent touch detection signal detection blocks are overlapped.

As illustrated in FIG. 26, in the touch detection device 30 in which each of the touch detection signal detection blocks Ba1 to Bam is constituted by four touch detection electrodes TDL, the touch detection electrodes TDL on a portion on which a touch is detected in each touch detection signal detection block only correspond to adjacent two touch detection electrodes TDL. For example, when a touch is detected on the touch detection signal detection block Ba2 only, a touch is detected on a portion corresponding to the adjacent touch detection electrodes TDL6 and TDL7 as illustrated in FIG. 26. In general, the above-mentioned absolute value |ΔV| based on the touch detection signals Vdet appearing on the adjacent touch detection electrodes TDL is increased. In other words, sensitivity of touch detection on the adjacent touch detection electrodes TDL is increased. Accordingly, as in the touch detection device 30 as illustrated in FIG. 25, the accuracy of position detection of the touch operation with the external object in the parallel arrangement direction of the touch detection electrodes TDL can be ensured and the sensitivity when a touch is detected on the respective touch detection signal detection blocks only can be improved.

Although the portions on which single touch detection electrodes TDL at the end sides of touch detection signal detection blocks adjacent to each other are switched are the block overlapped portions in the touch detection device 30 as illustrated in FIG. 25 and FIG. 26, the disclosure is not limited thereto. That is to say, a plurality of the touch detection electrodes TDL at the end side of the adjacent touch detection signal detection blocks may be switched. This can ensure the accuracy of position detection of the touch operation with the external object in the parallel arrangement direction of the touch detection electrodes TDL and improve the sensitivity when a touch is detected on the respective block overlapped portions.

The configuration of the touch detection electrodes TDL in the touch detection device 30 as illustrated in FIG. 25 and FIG. 26 can be also applied to the touch detection device according to the first, second, or third modification of the first embodiment.

3. Third Embodiment

Configuration of Electronic Apparatus

FIG. 27 to FIG. 38 are views illustrating the configuration when the display device with the touch detection function is applied to an electronic apparatus according to a third embodiment of the present disclosure. The display devices with the touch detection function 1 and 1a in the first and second embodiments can be applied to electronic apparatus in various fields such as a television apparatus, a digital camera, a video camera, a notebook-type personal computer, and a mobile phone. That is to say, display devices with the touch detection function 1 and 1a in the first and second embodiments can be applied to electronic apparatus in various fields in which a video image signal input externally or a video image signal generated internally is displayed as an image or a video image. These electronic apparatuses include a control device that executes pieces of processing corresponding to operations detected with the display device with the touch detection function and supplies a video image signal to the display device with the touch detection function. The configurations in which the display device with the touch detection function is applied to specific electronic apparatuses will be described with reference to FIG. 27 to FIG. 38.

Figure 27:
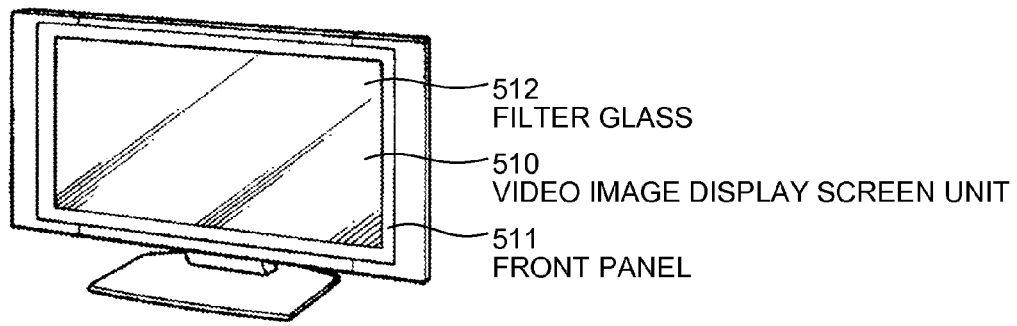
FIG. 27 is a view illustrating an example in which the display device with the touch detection function is applied to a television apparatus as an electronic apparatus according to a third embodiment of the present disclosure.

FIG. 27 is a view illustrating an example in which the display device with the touch detection function is applied to a television apparatus as the electronic apparatus in the third embodiment of the present disclosure. The television apparatus as the electronic apparatus as illustrated in FIG. 27 includes a video image display screen unit 510 including a front panel 511 and a filter glass 512 and the video image display screen unit 510 includes the display device with the touch detection function 1 or 1a according to the first or second embodiment.

Figure 28:
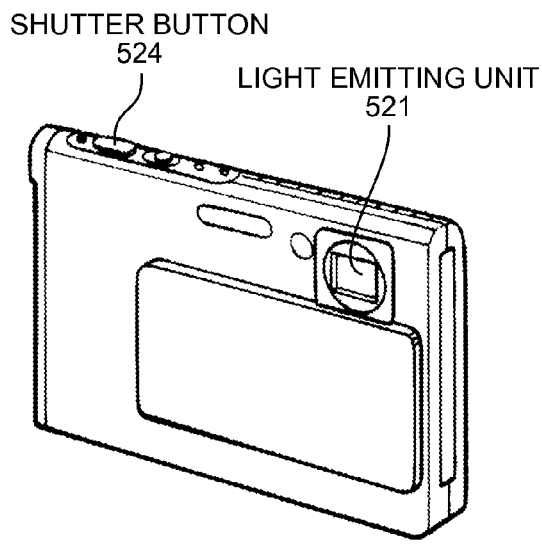
FIG. 28 is a view illustrating an example in which the display device with the touch detection function is applied to a digital camera as the electronic apparatus in the third embodiment of the present disclosure and is a front perspective view of the digital camera.
Figure 29:
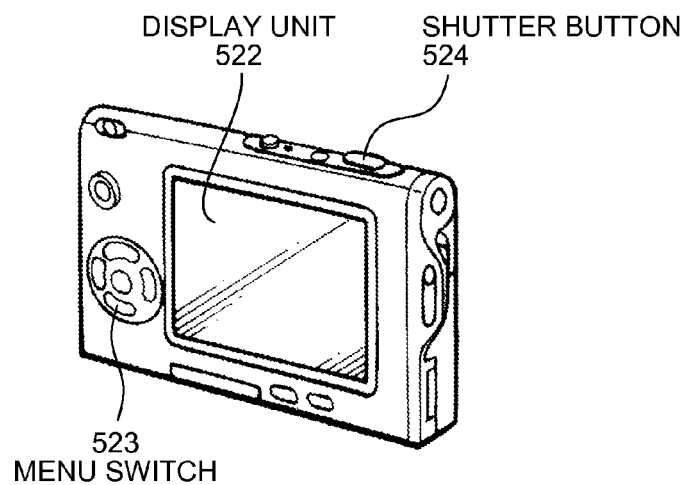
FIG. 29 is a view illustrating an example in which the display device with the touch detection function is applied to the digital camera as the electronic apparatus in the third embodiment of the present disclosure and is a rear perspective view of the digital camera.

FIG. 28 is a view illustrating an example of the display device with the touch detection function is applied to a digital camera as the electronic apparatus in the third embodiment of the present disclosure and is a front perspective view of the digital camera. FIG. 29 is a rear perspective view of the digital camera. The digital camera as the electronic apparatus as illustrated in FIG. 28 and FIG. 29 includes a flash light emitting unit 521, a display unit 522, a menu switch 523, and a shutter button 524. The display unit 522 includes the display device with the touch detection function 1 or 1a according to the first or second embodiment.

Figure 30:
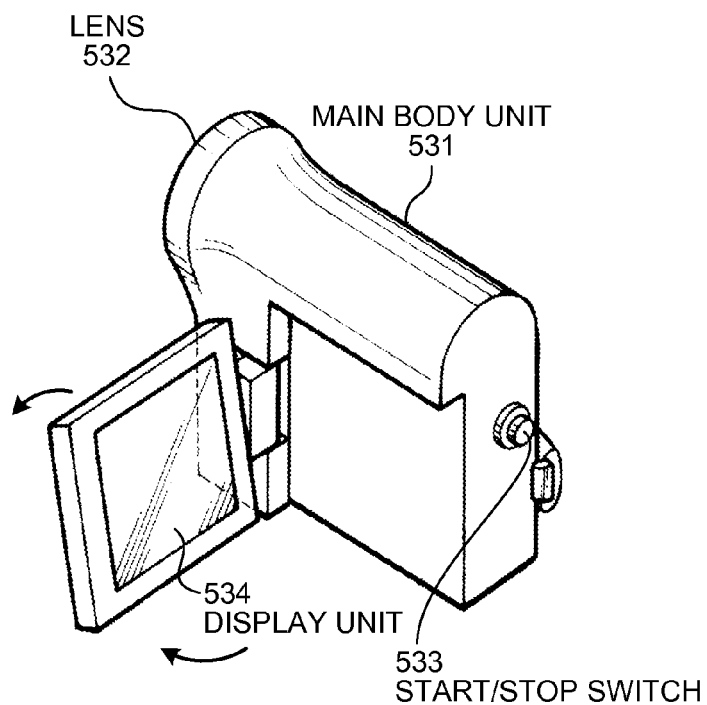
FIG. 30 is a view illustrating an example in which the display device with the touch detection function is applied to a video camera as the electronic apparatus in the third embodiment of the present disclosure.

FIG. 30 is a view illustrating an example in which the display device with the touch detection function is applied to a video camera as the electronic apparatus in the third embodiment of the present disclosure. The video camera as the electronic apparatus as illustrated in FIG. 30 includes a main body unit 531, an object shooting lens 532 provided on the front side surface of the main body unit 531, a start/stop switch 533 for starting and stopping shooting, and a display unit 534. The display unit 534 includes the display device with the touch detection function 1 or 1a according to the first or second embodiment.

Figure 31:
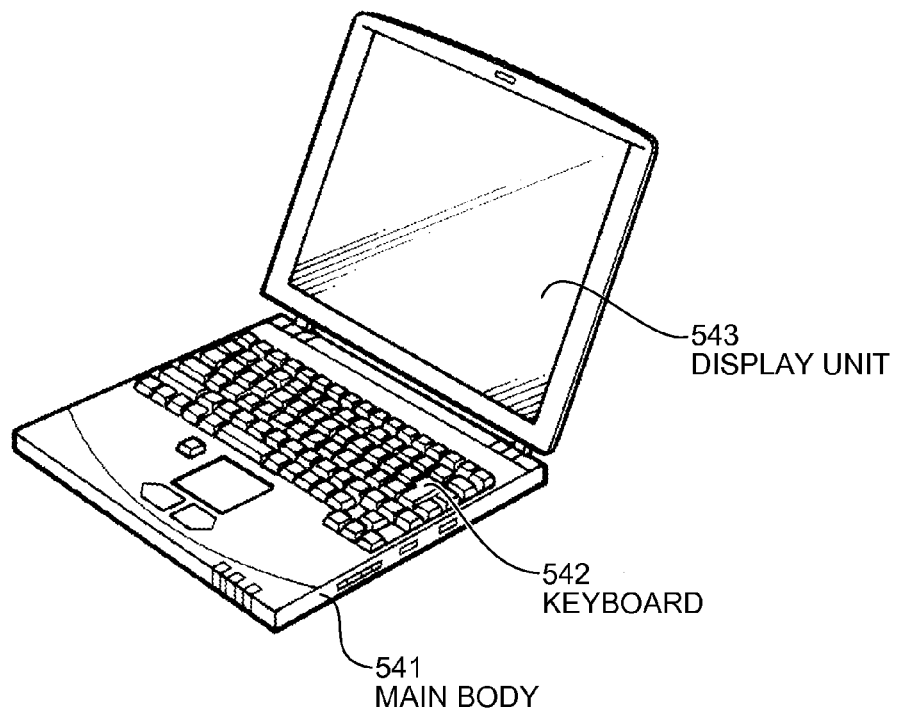
FIG. 31 is a view illustrating an example in which the display device with the touch detection function is applied to a notebook-type personal computer as the electronic apparatus in the third embodiment of the present disclosure.

FIG. 31 is a view illustrating an example in which the display device with the touch detection function is applied to a notebook-type personal computer as the electronic apparatus in the third embodiment of the present disclosure. The notebook-type personal computer as illustrated in FIG. 31 includes a main body 541, a keyboard 542 for an operation of inputting characters and the like, and a display unit 543 displaying images. The display unit 543 includes the display device with the touch detection function 1 or 1a according to the first or second embodiment.

Figure 32:
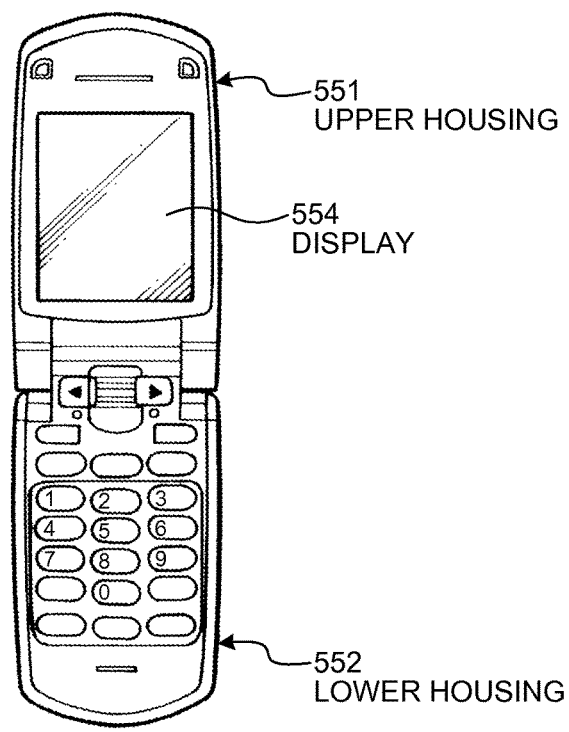
FIG. 32 is a view illustrating an example in which the display device with the touch detection function is applied to a mobile phone as the electronic apparatus in the third embodiment of the present disclosure and is a front view in a state where an upper housing and a lower housing are opened.
Figure 33:
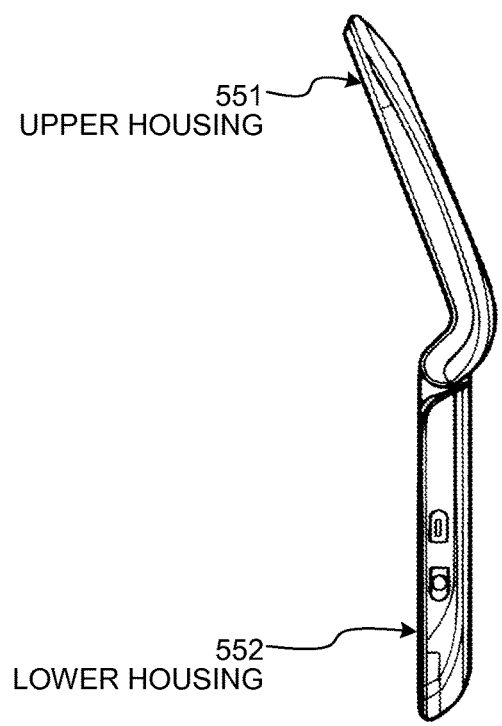
FIG. 33 is a view illustrating an example in which the display device with the touch detection function is applied to the mobile phone as the electronic apparatus in the third embodiment of the present disclosure and is a side view in the state where the upper housing and the lower housing are opened.
Figure 34:
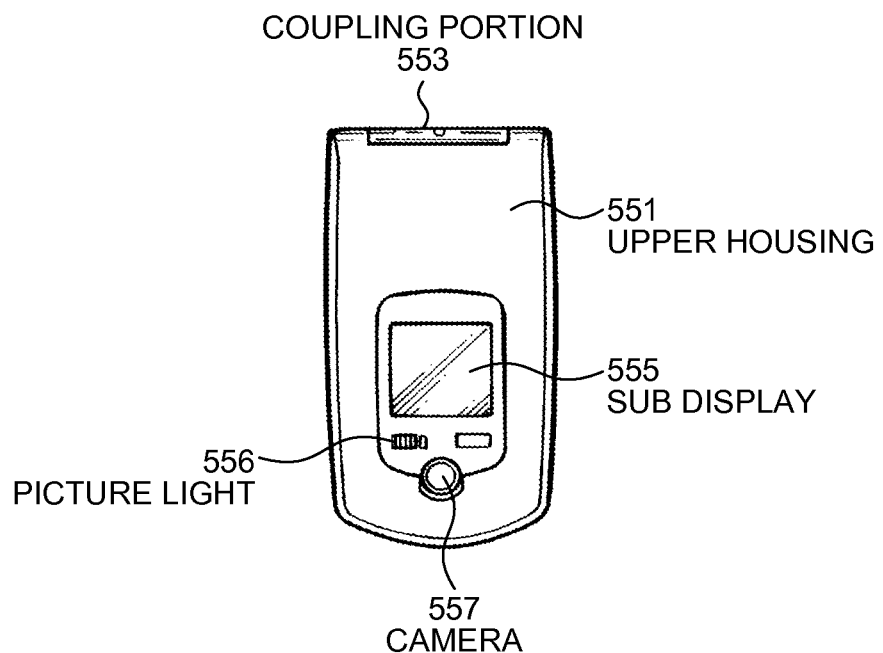
FIG. 34 is a view illustrating an example in which the display device with the touch detection function is applied to the mobile phone as the electronic apparatus in the third embodiment of the present disclosure and is a front view in a state where the upper housing and the lower housing are closed.
Figure 35:
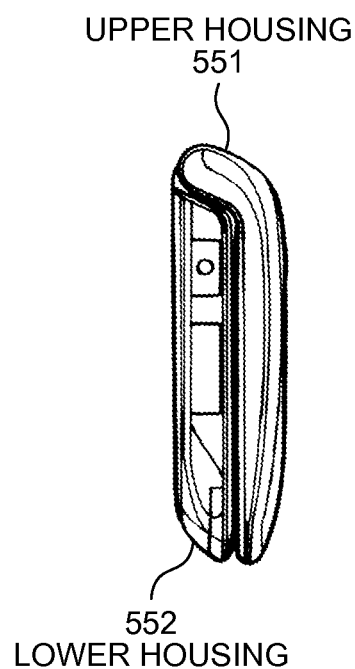
FIG. 35 is a view illustrating an example in which the display device with the touch detection function is applied to the mobile phone as the electronic apparatus in the third embodiment of the present disclosure and is a left side view in the state where the upper housing and the lower housing are closed.
Figure 36:
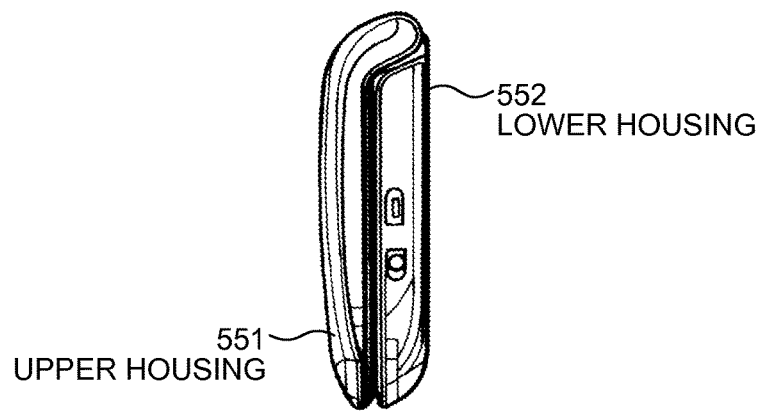
FIG. 36 is a view illustrating an example in which the display device with the touch detection function is applied to the mobile phone as the electronic apparatus in the third embodiment of the present disclosure and is a right side view in the state where the upper housing and the lower housing are closed.
Figure 37:
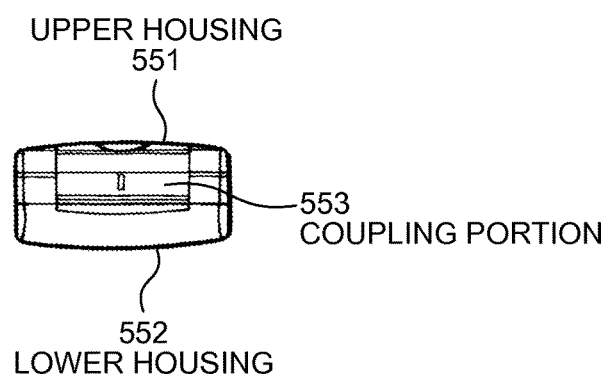
FIG. 37 is a view illustrating an example in which the display device with the touch detection function is applied to the mobile phone as the electronic apparatus in the third embodiment of the present disclosure and is a side view at a coupling portion side in the state where the upper housing and the lower housing are closed.
Figure 38:
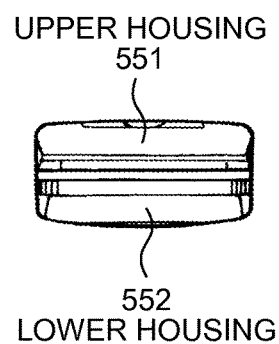
FIG. 38 is a view illustrating an example in which the display device with the touch detection function is applied to the mobile phone as the electronic apparatus in the third embodiment of the present disclosure and is a side view at an opening/closing portion side in the state where the upper housing and the lower housing are closed.

FIG. 32 is a view illustrating an example in which the display device with the touch detection function is applied to a mobile phone as the electronic apparatus in the third embodiment of the present disclosure and is a front view in a state where an upper housing and a lower housing are opened. FIG. 33 is a side view illustrating the mobile phone in the state where the upper housing and the lower housing are opened. FIG. 34 to FIG. 38 are a front view, a left side view, a right side view, a plan view, and a bottom view illustrating the mobile phone in the state where the upper housing and the lower housing are closed. The mobile phone as the electronic apparatus as illustrated in FIG. 32 to FIG. 38 is produced by coupling an upper housing 551 and a lower housing 552 with a coupling portion 553 and includes a display 554, a sub display 555, a picture light 556, and a camera 557. The display 554 or the sub display 555 includes the display device with the touch detection function 1 or 1*a* according to the first or second embodiment.

4. Aspects of Present Disclosure

The present disclosure includes the following aspects:

(1) A touch detection device comprising:
a plurality of drive electrodes arranged in parallel in a predetermined direction;
a plurality of touch detection electrodes arranged in parallel in a direction intersecting with the predetermined direction and forming electrostatic capacitances between the touch detection electrodes and the drive electrodes;
an operation drive unit applying a touch detection drive signal to the drive electrodes in a touch detection operation of detecting whether an external object makes contact with or is in proximity to the touch detection electrodes; and
a touch detection unit detecting a position of the external object that makes contact with or is in proximity to the touch detection electrodes based on touch detection signals detected from the touch detection electrodes in the touch detection operation, wherein
the drive electrodes are divided into a plurality of drive signal application blocks,
each of the drive signal application blocks contains equal to or more than three drive electrodes that are electrically connected and has a drive block overlapped portion on which an arrangement order of the drive electrodes is changed such that an area of at least one of the drive electrodes at an end side in the predetermined direction is swapped for an area of at least one of the drive electrodes in an adjacent drive signal application block at an end side in the predetermined direction, and
the operation drive unit sequentially applies the touch detection drive signal to each of the drive signal application blocks.

(2) The touch detection device according to (1), wherein the numbers of drive electrodes constituting the respective drive signal application blocks are the same, and drive signal application blocks other than drive signal application blocks arranged at end sides in the predetermined direction out of the drive signal application blocks have a uniform electrode pattern of the drive electrodes that are contained in the respective drive signal application blocks.

(3) The touch detection device according to (1) or (2), wherein drive electrodes other than drive electrodes on the drive block overlapped portion in each of the drive signal application blocks are the drive electrodes adjacent in the predetermined direction.

(4) The touch detection device according to any one of (1) to (3), wherein the drive block overlapped portion includes drive electrodes adjacent to each other in the predetermined direction that are contained in the same drive signal application block.

(5) The touch detection device according to any one of (1) to (4), wherein the operation drive unit has a switching function of arbitrarily switching an electric connection state among the respective drive electrodes, and the switching function electrically connects the drive electrodes constituting the same drive signal application blocks.

(6) The touch detection device according to (5), wherein the operation drive unit changes at least one of the number of drive electrodes constituting each of the drive signal application blocks and an electrode pattern of the drive electrodes based on the external object detected by the touch detection unit.

(7) The touch detection device according to any one of (1) to (4), wherein the drive electrodes constituting the drive signal application blocks are electrically connected outside the operation drive unit.

(8) The touch detection device according to any one of (1) to (7), wherein
the touch detection electrodes are divided into a plurality of touch detection signal detection blocks,
each of the touch detection signal detection blocks contains equal to or more than three touch detection electrodes that are electrically connected and has a detection block overlapped portion on which an arrangement order of the drive electrodes is changed such that an area of at least one of the touch detection electrodes at an end side in the intersecting direction is swapped for an area of at least one of the drive electrodes in an adjacent touch detection signal detection block at an end side in the intersecting direction, and
the touch detection unit detects the touch detection signal on each of the touch detection signal detection blocks.

(9) The touch detection device according to (8), wherein the numbers of touch detection electrodes constituting the respective touch detection signal detection blocks are the same, and touch detection signal detection blocks other than touch detection signal detection blocks at end sides in the intersecting direction have a uniform electrode pattern of the touch detection electrodes that are contained in the respective touch detection signal detection blocks.

(10) The touch detection device according to (8) or (9), wherein touch detection electrodes other than touch detection electrodes on the detection block overlapped portion in each of the touch detection signal detection blocks are touch detection electrodes adjacent in the intersecting direction.

(11) The touch detection device according to any one of (8) to (10), wherein the detection block overlapped portion includes the touch detection electrodes adjacent to each other in the intersecting direction that are contained in the same touch detection signal detection block.

(12) The touch detection device according to any one of (8) to (11), wherein the touch detection unit has a switching function of arbitrarily switching an electric connection state among the touch detection electrodes, and the switching function electrically connects the touch detection electrodes constituting the same touch detection signal detection blocks.

(13) The touch detection device according to (12), wherein the touch detection unit changes at least one of the number of touch detection electrodes constituting each of the touch detection signal detection blocks and an electrode pattern of the touch detection electrodes based on the external object detected.

(14) The touch detection device according to any one of (8) to (11), wherein the touch detection electrodes constituting the touch detection signal detection blocks are electrically connected outside the touch detection unit.

(15) A display device with a touch detection function comprising:
the touch detection device according to any one of (1) to (14);
a plurality of pixel electrodes to which a pixel signal for causing pixels to execute a display operation is applied; and
a display drive unit that applies the pixel signal to the pixel electrodes and executes the display operation, wherein
the operation drive unit applies a display drive signal synchronized with the pixel signal to the drive electrodes in the display operation.

(16) The display device with the touch detection function according to (15), wherein the drive electrodes include a plurality of first drive electrodes to which the display drive signal is applied in the display operation and a plurality of second drive electrodes to which the touch detection drive signal is applied in the touch detection operation.

(17) The display device with the touch detection function according to (15) or (16), further comprising a controller controlling the display drive unit and the operation drive unit, wherein the controller performs control for alternately repeating a display operation period in which the display operation is executed and a touch detection period in which the touch detection operation is executed.

(18) An electronic apparatus comprising:

the display device with the touch detection function according to any one of (15) to (17); and a control device executing processing corresponding to an operation detected by the display device with the touch detection function and supplying a video image signal to the display device with the touch detection function.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch detection device comprising:
   a plurality of drive electrodes arranged in parallel in a predetermined direction;
   a plurality of touch detection electrodes arranged in parallel in a direction intersecting with the predetermined direction and forming electrostatic capacitances between the touch detection electrodes and the drive electrodes;
   an operation drive unit applying a touch detection drive signal to the drive electrodes in a touch detection operation of detecting whether an external object makes contact with or is in proximity to the touch detection electrodes; and
   a touch detection unit detecting a position of the external object that makes contact with or is in proximity to the touch detection electrodes based on touch detection signals detected from the touch detection electrodes in the touch detection operation, wherein
   the drive electrodes are divided into a plurality of drive signal application blocks,
   each of the drive signal application blocks contains equal to or more than three drive electrodes that are electrically connected and has a drive block overlapped portion on which an arrangement order of the drive electrodes is changed such that an area of at least one of the drive electrodes at an end side in the predetermined direction is swapped for an area of at least one of the drive electrodes in an adjacent drive signal application block at an end side in the predetermined direction, and
   the operation drive unit is configured to:
   switch an electric connection state among the respective drive electrodes between a first mode and a second mode;
   executes, in the first mode when the touch detection unit detects a touch on the touch detection electrodes of a first detection number that is equal or more than a predetermined number, a touch detection for each drive signal application block by electrically connecting the drive electrodes constituting the same drive signal application blocks and sequentially applying the touch detection drive signal to each of the drive signal application blocks; and
   executes, in the second mode when the touch detection unit detects a touch on the touch detection electrodes of a second detection number that is less than the predetermined number, a touch detection for one or more drive electrodes by changing the number of the drive electrodes that are connected together in at least one of the drive signal application blocks according to the second detection number.

2. The touch detection device according to claim 1, wherein the numbers of drive electrodes constituting the respective drive signal application blocks are the same, and drive signal application blocks other than drive signal application blocks arranged at end sides in the predetermined direction out of the drive signal application blocks have a uniform electrode pattern of the drive electrodes that are contained in the respective drive signal application blocks.

3. The touch detection device according to claim 1, wherein drive electrodes other than drive electrodes on the drive block overlapped portion in each of the drive signal application blocks are the drive electrodes adjacent in the predetermined direction.

4. The touch detection device according to claim 1, wherein the drive block overlapped portion includes drive electrodes adjacent to each other in the predetermined direction that are contained in the same drive signal application block.

5. The touch detection device according to claim 1, wherein the drive electrodes constituting the drive signal application blocks are electrically connected outside the operation drive unit.

6. The touch detection device according to claim 1, wherein
   the touch detection electrodes are divided into a plurality of touch detection signal detection blocks,
   each of the touch detection signal detection blocks contains equal to or more than three touch detection electrodes that are electrically connected and has a detection block overlapped portion on which an arrangement order of the drive electrodes is changed such that an area of at least one of the touch detection electrodes at an end side in the intersecting direction is swapped for an area at least one of the drive electrodes in an adjacent touch detection signal detection block at an end side in the intersecting direction, and
   the touch detection unit detects the touch detection signal on each of the touch detection signal detection blocks.

7. The touch detection device according to claim 6, wherein the numbers of touch detection electrodes constituting the respective touch detection signal detection blocks are the same, and touch detection signal detection blocks other than touch detection signal detection blocks at end sides in the intersecting direction have a uniform electrode pattern of the touch detection electrodes that are contained in the respective touch detection signal detection blocks.

8. The touch detection device according to claim 6, wherein touch detection electrodes other than touch detection electrodes on the detection block overlapped portion in each of the touch detection signal detection blocks are touch detection electrodes adjacent in the intersecting direction.

9. The touch detection device according to claim 6, wherein the detection block overlapped portion includes the touch detection electrodes adjacent to each other in the intersecting direction that are contained in the same touch detection signal detection block.

10. The touch detection device according to claim 6, wherein the touch detection unit has a switching function of arbitrarily switching the electric connection state among the touch detection electrodes, and the switching function electrically connects the touch detection electrodes constituting the same touch detection signal detection blocks.

11. The touch detection device according to claim 10, wherein the touch detection unit changes at least one of the number of touch detection electrodes constituting each of the touch detection signal detection blocks and an electrode pattern of the touch detection electrodes based on the external object detected.

12. The touch detection device according to claim 6, wherein the touch detection electrodes constituting the touch detection signal detection blocks are electrically connected outside the touch detection unit.

13. The touch detection device according to claim 6, wherein each of the touch detection signal detection blocks contains four touch detection electrodes.

14. A display device with a touch detection function comprising:
the touch detection device according to claim 1;
a plurality of pixel electrodes to which a pixel signal for causing pixels to execute a display operation is applied; and
a display drive unit that applies the pixel signal to the pixel electrodes and executes the display operation, wherein
the operation drive unit applies a display drive signal synchronized with the pixel signal to the drive electrodes in the display operation.

15. The display device with the touch detection function according to claim 14, wherein the drive electrodes include a plurality of first drive electrodes to which the display drive signal is applied in the display operation and a plurality of second drive electrodes to which the touch detection drive signal is applied in the touch detection operation.

16. The display device with the touch detection function according to claim 14, further comprising a controller controlling the display drive unit and the operation drive unit, wherein
the controller performs control for alternately repeating a display operation period in which the display operation is executed and a touch detection period in which the touch detection operation is executed.

17. An electronic apparatus comprising:
the display device with the touch detection function according to claim 14; and
a control device executing processing corresponding to an operation detected by the display device with the touch detection function and supplying a video image signal to the display device with the touch detection function.

18. The touch detection device according to claim 1, wherein
the operation drive unit is configured to executes, in the second mode, the touch detection for the respective drive electrode.

19. The touch detection device according to claim 1, wherein the operation drive unit is configured to:
switch an electric connection state among the respective drive electrodes between the first mode when the touch detection unit detects a touch on the touch detection electrodes of a first detection number that is equal or more than a predetermined number and the second mode when the touch detection unit detects a touch on the touch detection electrodes of a second detection number that is less than the predetermined number.

20. The touch detection device according to claim 19, wherein the operation drive unit is configured to:
execute, in the second mode, the touch detection for one or more drive electrodes by reducing the number of the drive electrodes that are connected together in at least one of the drive signal application blocks according to the second detection number and sequentially applying the touch detection drive signal to each of the drive signal application blocks.

* * * * *